(12) United States Patent
Tian et al.

(10) Patent No.: US 10,368,195 B2
(45) Date of Patent: Jul. 30, 2019

(54) ELECTRONIC DEVICE IN WIRELESS COMMUNICATION SYSTEM AND WIRELESS COMMUNICATION METHOD

(71) Applicant: Sony Corporation, Tokyo (JP)

(72) Inventors: Hui Tian, Beijing (CN); Yang Liu, Beijing (CN); Xi Ke, Beijing (CN); Mingyang Li, Beijing (CN); Xinchen Lu, Beijing (CN); Yi Zhang, Beijing (CN)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/574,613

(22) PCT Filed: May 25, 2016

(86) PCT No.: PCT/CN2016/083299
§ 371 (c)(1),
(2) Date: Nov. 16, 2017

(87) PCT Pub. No.: WO2016/192553
PCT Pub. Date: Dec. 8, 2016

(65) Prior Publication Data
US 2018/0167775 A1 Jun. 14, 2018

(30) Foreign Application Priority Data

Jun. 1, 2015 (CN) .......................... 2015 1 0292840

(51) Int. Cl.
*H04W 4/02* (2018.01)
*H04W 64/00* (2009.01)
(Continued)

(52) U.S. Cl.
CPC ........... *H04W 4/023* (2013.01); *H04L 5/0048* (2013.01); *H04W 8/005* (2013.01); *H04W 64/00* (2013.01); *H04W 64/003* (2013.01); *H04W 16/32* (2013.01)

(58) Field of Classification Search
CPC ....... H04W 4/02; H04W 4/023; H04W 4/025; H04W 16/32; H04W 24/08; H04W 48/16; (Continued)

(56) References Cited

U.S. PATENT DOCUMENTS

| 2014/0349677 | A1* | 11/2014 | Xiao | ........................ | H04W 4/02 |
| | | | | | 455/456.1 |
| 2015/0208269 | A1* | 7/2015 | Damnjanovic | ....... | H04L 1/0026 |
| | | | | | 370/252 |
| 2016/0050534 | A1 | 2/2016 | Lim et al. | | |

FOREIGN PATENT DOCUMENTS

WO  2013/137645 A1  9/2013

OTHER PUBLICATIONS

International Search Report dated Sep. 1, 2016 in PCT/CN2016/083299 filed May 25, 2016.

* cited by examiner

*Primary Examiner* — George Eng
*Assistant Examiner* — Hung K Du
(74) *Attorney, Agent, or Firm* — Xsensus, LLP

(57) ABSTRACT

The present disclosure relates to an electronic device in a wireless communication system and a wireless communication method. The electronic device comprises: one or more processing circuits, wherein the processing circuits are configured to execute the following operations: acquiring an on/off state of a small cell base station in a pre-determined geographical area; and on the basis of the acquired on/off state of the small cell base station, generating reconfiguration information about a positioning reference signal (PRS)

(Continued)

used for the small cell base station in the pre-determined geographical area, so as to position user equipment in the pre-determined geographical area. By using the electronic device and the wireless communication method in the present disclosure, an existing PRS signal can be reconfigured, so as to improve the positioning accuracy, and achieve the purpose of accelerating the positioning process.

16 Claims, 12 Drawing Sheets

(51) Int. Cl.
*H04L 5/00* (2006.01)
*H04W 8/00* (2009.01)
*H04W 16/32* (2009.01)

(58) Field of Classification Search
CPC . H04W 64/00; H04W 64/003; H04W 72/042; H04W 72/0446; H04W 72/0453; H04W 8/005; H04L 5/0023; H04L 5/0048; H04L 5/0094
See application file for complete search history.

ELECTRONIC DEVICE IN WIRELESS COMMUNICATION SYSTEM AND WIRELESS COMMUNICATION METHOD

CROSS-REFERENCE TO RELATED APPLICATIONS

The present application is a National Stage application of PCT international patent application PCT/CN2016/083299, filed on May 25, 2016, which claims the priority to Chinese Patent Application No. 201510292840.4, titled "ELECTRONIC DEVICE IN WIRELESS COMMUNICATION SYSTEM AND WIRELESS COMMUNICATION METHOD", filed with the Chinese State Intellectual Property Office on Jun. 1, 2015, and the entire disclosure of which is incorporated herein by reference.

FIELD

The present disclosure relates to the technical filed of wireless communication, and particularly to an electronic device in a wireless communication system and a wireless communication method in a wireless communication system.

BACKGROUND

Background information related to the present disclosure is provided in this background part, and the background information is not necessarily the conventional technology.

A small cell network (SCN) is considered as an effect means for coping with rapid increase of data traffic. In discussion for standardization of the wireless communication, a new reference signal, i.e. a discovery reference signal (DRS), is used to support a small cell on/off mechanism. A small cell base station only transmits the DRS in an off state of the small cell.

Indoor positioning is one of important works in standardization of wireless communication technology. Existing observed time difference of arrival (OTDOA) technology is served as an important consideration in the indoor positioning technology. Since the OTDOA cannot have an enough accuracy only based on a cell specific reference signal, a positioning reference signal (PRS) is introduced.

However, the small cell does not transmit the PRS in an off state. In a case that the OTDOA is only based on the traditional PRS, a positioning accuracy for a user equipment is reduced and even it is unable to position the user equipment, when a large number of small cells are in the off state.

Therefore, it is necessary to provide a new wireless communication technical solution to improve a positioning accuracy and accelerate a positioning process.

SUMMARY

A general overview rather than all scopes or all features of the present disclosure is provided in this summary part.

An objective of the present disclosure is to provide an electronic device in a wireless communication system and a method for performing wireless communication in a wireless communication system, to enable the small cell on/off technology and the OTDOA technology to be compatible with each other, and therefore improve a positioning accuracy for a user equipment and accelerate a positioning process.

An electronic device in a wireless communication system is provided in an aspect of the present disclosure, which includes one or more processing circuits configured to: acquire an on/off state of a small cell base station within a predetermined geographical region; and generate, based on the acquired on/off state of the small cell base station, reconfiguration information of a positioning reference signal (PRS) for the small cell base station within the predetermined geographical region, to position a user equipment within the predetermined geographical region.

An electronic device in a wireless communication system is provided in another aspect of the present disclosure, which includes one or more processing circuits configured to: determine reconfiguration information of a positioning reference signal PRS from a control device, where the reconfiguration information of the PRS includes blending information indicating the PRS is configured in a discovery reference signal DRS; and reconfigure the DRS based on the blending information, to position a user equipment.

An electronic device in a wireless communication system is provided in another aspect of the present disclosure, which includes one or more processing circuits configured to: determine reconfiguration information of a positioning reference signal PRS from a control device, where the reconfiguration information of the PRS includes PRS configuration assistance information of an off small cell base station; and reconfigure the PRS based on the PRS configuration assistance information, to position a user equipment using a time frequency resource of the off small cell base station for transmitting a PRS as an idle resource.

An electronic device in a wireless communication system is provided in another aspect of the present disclosure, which includes one or more processors configured to: determine positioning measurement assistance data for a user equipment, where the positioning measurement assistance data includes reconfiguration information of a positioning reference signal PRS of a small cell base station; perform positioning measurement on a PRS transmitted by the small cell base station based on the positioning measurement assistance data; and generate positioning information based on a result of the performing positioning measurement on the PRS transmitted by the small cell base station, to position the user equipment.

A method for performing wireless communication in a wireless communication system is provided in another aspect of the present disclosure, which includes: acquiring an on/off state of a small cell base station within a predetermined geographical region; and generating, based on the acquired on/off state of the small cell base station, reconfiguration information of a positioning reference signal PRS for the small cell base station within the predetermined geographical region, to position a user equipment within the predetermined geographical region.

A method for performing wireless communication in a wireless communication system is provided in another aspect of the present disclosure, which includes: determining reconfiguration information of a positioning reference signal PRS from a control device, where the reconfiguration information of the PRS includes blending information indicating that the PRS is configured in a discovery reference signal DRS; and reconfiguring the DRS based on the blending information, to position a user equipment.

A method for performing wireless communication in a wireless communication system is provided in another aspect of the present disclosure, which includes: determining reconfiguration information of a positioning reference signal PRS from a control device, where the reconfiguration information of the PRS includes PRS configuration assistance information of an off small cell base station; and reconfiguring the PRS based on the PRS configuration assistance information, to position a user equipment using a time frequency resource of the off small cell base station for transmitting a PRS as an idle resource.

A method for performing wireless communication in a wireless communication system is provided in another aspect of the present disclosure, which includes: determining positioning measurement assistance data for a user equipment, where the positioning measurement assistance data includes reconfiguration information of a positioning reference signal PRS of a small cell base station; performing positioning measurement on a PRS transmitted by the small cell base station based on the positioning measurement assistance data; and generating positioning information based on a result of the performing positioning measurement on the PRS transmitted by the small cell base station, to position the user equipment.

With the electronic devices in the wireless communication system and the wireless communication methods in the wireless communication system according to the present disclosure, the existing PRS may be reconfigured, to improve the positioning accuracy and accelerate the positioning process.

A further applicable scope becomes more apparent from the description provided here. The description and the specific examples in the overview are only illustrative, and are not intended to limit the scope of the present disclosure.

BRIEF DESCRIPTION OF THE DRAWINGS

The drawings are only used for illustrating the selected embodiments rather than all possible implementations, and are not intended to limit the scope of the present disclosure. In the drawings.

Figure 1:
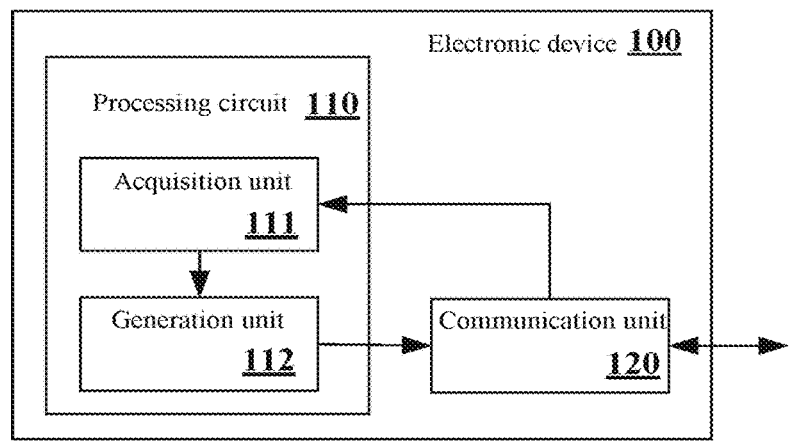
FIG. 1 is a structural block diagram of an electronic device in a wireless communication system according to an embodiment of the present disclosure.

Although various modification and alternations are easily made onto the present disclosure, the specific embodiments are shown in the drawings as an example, and are described in detail here. It should be understood that description for the specific embodiments is not intended to limit the present disclosure into a disclosed specific form, and the present disclosure aims to cover all modification, equivalents and alternations within the spirit and scope of the present disclosure. It should be noted that, a numeral denotes a component corresponding to the numeral through the drawings.

DETAILED DESCRIPTION OF THE EMBODIMENTS

The example of the present disclosure is described more fully with reference to the drawings, and the following description is only exemplary and is not intended to limit the present disclosure, an application or use.

Exemplary embodiments are provided to make the present disclosure thorough, and to convey the scope of the present disclosure to those skilled in the art. Examples of many specific details such as specific components, devices and methods are described to provide thorough understanding for the embodiments of the present disclosure. It is apparent for those skilled in the art that the exemplary embodiments may be embodied in multiple different manners without using specific details, and the exemplary embodiments should not be interpreted to limit the scope of the present disclosure. Well-known processes, structures and technology are not described in detail in some exemplary embodiments.

A user equipment (UE) related in the present disclosure includes but is not limited to a terminal having a wireless communication function such as a mobile terminal, a computer, an in-vehicle device, etc. Furthermore, the UE related in the present disclosure may also be the UE itself or a component for example a chip in the UE. In addition, a base station related in the present disclosure may be for example an evolution node base station (eNB) or a component such as a chip in the eNB.

Observed time different of arrival (OTDOA) technology known by the inventor is introduced below first, and the OTDOA technology is not necessarily the conventional technology.

The positioning based on the OTDOA is a downlink positioning way defined in the long term evolution (LTE) Rel-9. In the OTDOA, the user equipment (UE) measures time of arrival (TOA) of reference signals of multiple base stations, and calculates a time difference of arrival between an adjacent cell and a reference cell. Geometrically, a time difference of arrival between each adjacent cell and a reference cell may be represented as a hyperbola on a two-dimensional plane. In this case, two hyperbolas may be obtained by at least measuring TOAs of reference signals of three base stations, to obtain a position (latitude and longitude) of the UE in a two-dimension coordinate.

The OTDOA is performed based on a time difference between a reference signal of an adjacent cell and a reference signal of a serving cell measured by the UE, which is referred as reference signal time difference (RSTD).

However, generally, a downlink signal transmitted by an adjacent cell has poor audibility for a UE out of a serving range of the adjacent cell, which result in seriously affecting a positioning accuracy and a positioning success rate of the OTDOA.

For example, a synchronization signal (for example a primary synchronization signal (PSS) or a secondary synchronization signal (SSS)) of the adjacent cell may be used for measuring, however, the UE is difficult to detect enough adjacent cells to perform accurate positioning.

Therefore, in order to increase a probability of detecting the adjacent cell by the UE, and obtain good positioning reliability of the OTDOA, a positioning reference signal (PRS) is defined in the LTE Rel-9 specially.

The PRS is similar to a cell-specific reference signal (CRS) defined in the LTE Rel-8 mostly. A pseudorandom quadrature phase shift keying (QPSK) sequence is used in the PRS, and the PRS is mapped into a diagonal shape by staggering in time and frequency, to avoid from conflicting with the CRS. The PRS can be transmitted only in a port 6 of an antenna, and cannot be mapped into resource blocks occupied by a physical broadcast channel (PBCH), a PSS and an SSS. A bandwidth of the PRS is defined to be 15 kHz.

A positioning subframe is designed as a subframe having low interference, and is not transmitted on a physical downlink shared channel (PDSCH). In a full-synchronization network, the PRS suffers from interference only from a PRS of other cell having a same transmission model, and does not suffer from interference from a data signal.

The PRS is transmitted in a predefined positioning subframe, and the positioning subframe is composed of NPRS consecutive subframes, which is referred as "a positioning interval". A period of the positioning interval is TPRS, and the TPRS is defined in the 3GPP TS 36.211 and may be equal to 160 subframes, 320 subframes, 640 subframes or 1280 subframes. And the number NPRS of the consecutive subframes may be 1 subframe, 2 subframes, 4 subframes or 6 subframes.

A third parameter for characterizing a transmission time sequence of the PRS is a cell-specific subframe offset APRS that defines a subframe number, from which the PRS starts to transmit, with respect to system frame number (SFN)=0 (which can be inferred from an initial position of each PRS period). The parameters TPRS and ΔPRS may be obtained based on a configuration index IPRS of the PRS.

The PRS is transmitted with a constant power within each positioning interval. In some positioning intervals, the PRS may also be transmitted with a power of 0, which is referred as "PRS silence". After a strong PRS received by the UE (for example, received from a serving cell) become silent, a PRS having small power of the adjacent cell (having same frequency offset) is more easily to be detected by the UE.

According to regulations of the 3GPP TS 36.355, a silence configuration of the PRS within a cell is defined by a silence sequence having a period of TREP, and the TREP is equal to 2, 4, 8 or 16 positioning intervals. A silence message of the PRS is identified by a bit string having the length of 2, 4, 8 or 16 bits (corresponding to different TREPs), and each bit in the bit string may have a value of 0 or 1. If a certain bit in the silence message of the PRS is set to be 0, a PRS in a PRS transmission interval corresponding to the certain bit is in silence. A first bit in the silence sequence of the PRS corresponds to a first PRS transmission interval from SFN=0 of an assistance data reference cell.

A core network element of a positioning method based on the OTDOA is location server (LS). In control plane (CP) positioning, the location server plays a role of an evolved serving mobile location center (E-SMLC), and in user plane (UP) positioning, the location server is equivalent to a secure user plane location (SUPL) location platform (SLP).

A gateway mobile location center (GMLC) is a first node accessed by an external client terminal to the control plane positioning. After being registered and authorized, the GMLC transmits a positioning request to the mobility management entity (MME), and receives estimation for a final positioning result from the MME.

The location server transmits positioning assistance data to the UE, and the UE reports a measurement result for the RSTD to the location server, so that the location server completes positioning based on the OTDOA for a terminal equipment. The location server can also calculate (with assistance of the UE) or verify (based on the UE) estimation for a final location.

In the control plane scheme, the MME receives a positioning service request for a specific UE from another entity (such as a GMLC or a UE), or the MME initiates positioning initialization for a specific UE. Then, the MME transmits the positioning service request to the E-SMLC, and the E-SMILC processes the positioning service request, and transmits positioning assistance data for the OTDOA to a target UE. The E-SMLC returns a positioning service result information to the MME. The MME transmits the positioning service result to the entity which initiates the positioning service request if the positioning service request is not transmitted by the MME.

The SLP is an SUPL entity responsible for the user plane positioning, and the SLP directly communicates with the UE in a user plane by data bearing. The SLP has a same function as the E-SMLC in the positioning processes of the OTDOA.

A positioning protocol processes between the location servers (the E-SMLC or the SUPL SLP) generally includes three parts: bearing transmission, assistance data transmission and positioning information transmission.

The UE acquires a time when a PRS arrives at the UE and accurate PRS configuration information when performing RSTD measurement. Therefore, in order to better ensure the RSTD measurement, the location server in a network transmits OTDOA assistance data to the UE. The OTDOA assistance data includes two factors as follows:

1. OTDOA reference cell information (OTDOA Reference Cell Info) which includes a parameter of a reference cell, and a parameter in a neighbour cell list for the OTDOA is set based on the OTDOA Reference Cell Info; and 2. OTDOA neighbour cell information (OTDOA Neighbour Cell Info) which includes a parameter of each of neighbour cells, the parameters are ranked in a descending order of measurement priority levels, the order is determined by the server, and the UE performs the RSTD measurement in the order provided by the location server.

According to the 3rd generation partnership project (3GPP) technical specification (TS) 36.355, the OTDOA Reference Cell Info and the OTDOA Neighbour Cell Info are contained in a "ProvideAssistanceData" message, and the "ProvideAssistanceData" message and a "RequestAssistanceData" message are contained in a "LPP message". According to the 3GPP TS 24.171, the "LPP message" is transmitted in "Uplink/Downlink Generic NAS Transport message", that is, the "LPP message" is contained in the NAS protocol.

The factor of the OTDOA Reference Cell Info includes an identification of the reference cell, the PRS configuration information and the like, as shown in Table 1, "M" represents that an element definitely appears in measurement information, "0" represents that the element appears in the measurement information optionally, and "C" represents that the element appears in the measurement information in a certain condition, and the condition is described in definition for the element.

TABLE 1

OTDOA Reference Cell Assistance Information

| Element | Definition | Appearance |
|---|---|---|
| Physical cell ID | Physical cell ID is used to specify a PCI of a reference cell, and identify the cell and determine a PRS sequence | M |
| Cell global ID | Cell global ID is used to specify an ECGI of the reference cell, which is a global unique identity of the cell in the E-UTRA, and it may be used to solve any PCI ambiguity problem | O |
| EARFCN | EARFCN is used to specify an EARFCN of the reference cell in a case of being different from a primary cell of a UE | C |
| Antenna port configuration | Antenna port configuration is used to specify whether there is one (or two) or four antenna ports used for a CRS of the reference cell in a case of being different from the primary cell of the UE, and determine a CRS mapped into a resource unit | C |
| CP length | CP length is used to specify the length of cyclic prefix of a PRS and the CRS of the reference cell in a case of being different from the primary cell of the UE, and determine sequence generation and map to the resource unit | C |
| PRS Info | PRS Info is used to define configuration of the PRS of the cell in a case that the PRS is configured in the reference cell | C |

The factor of the OTDOA Neighbour Cell Info includes an identifier, PRS configuration information and a RSTD testing window of each neighbour cell. As shown in Table 2, an information list of neighbour cells may at most include information on 72 cells.

TABLE 2

OTDOA Neighbour Cell Assistance Information

| Element | Definition | Appearance |
|---|---|---|
| Physical cell ID | Physical cell ID is used to specify a PCI of a specific neighbour cell, and identify the cell and determine a PRS sequence | M |
| Cell global ID | Cell global ID is used to specify an ECGI of a specific neighbour cell, which is a global unique identity of the cell in the E-UTRA, and it may be used to solve any PCI ambiguity problem | O |
| EARFCN | EARFCN is used to specify an EARFCN of a specific neighbour cell in a case of being different from an OTDOA reference cell | C |
| CP length | CP length is used to specify the length of cyclic prefix of a PRS and the CRS of a specific neighbour cell in a case of being different from the OTDOA reference cell, and determine sequence generation and map to the resource unit | C |
| PRS Info | PRS Info is used to determine PRS configuration of the cell in a case of being different from the OTDOA reference cell | C |
| Antenna port configuration | Antenna port configuration is used to specify whether there is one (or two) or four antenna ports used for a CRS of a specific neighbour cell in a case of being different from the OTDOA reference cell, and determine a CRS mapped into a resource unit | C |
| Shift on time slot number | Shift on time slot number is used to specify a shift of the time slot number at a transmitter between a specific cell and an assistance data reference cell in a case that timing of a time slot of the specific cell is different from that of the OTDOA reference cell. The shift on time slot number together with a current time slot number of the assistance data reference cell is used to calculate a current time slot number of the specific cell, and it may be further used by the target equipment to generate a CRS sequence. PRS/CRS sequence depends on timing of a frame/slot | C |
| PRS subframe shift | PRS subframe shift is used to specify a shift between a first PRS subframe of the assistance data reference cell in a reference carrier frequency and a first PRS subframe in a nearest subsequent PRS positioning situation of the cell in other carrier frequency (in a case that an intermediate frequency cell is included in the assistance data) | C |
| Desired RSTD | Desired RSTD is used to specify a RSTD value between the cell and the assistance data reference cell which the UE expects to measure | M |
| Desired RETD uncertainty | Desired RETD uncertainty is used to specify uncertainty of the desired RSTD value | M |

Both the information element of the reference cell and the information element of the neighbour cell includes PRS configuration information, and a PRS information element includes information on configuration and a time sequence of the PRS, as shown in Table 3.

TABLE 3

PRS Information Element

| Element | Definition | Appearance |
|---|---|---|
| PRS bandwidth | PRS bandwidth is used to specify a bandwidth for the PRS in a manner of the number of resource blocks. 1.4 MHz, 3 MHz, 5 MHz, 10 MHz, 15 MHz and 20 MHz are possible | M |
| PRS configuration index | PRS configuration index is used to specify $I_{PRS}$ | M |
| The number of PRS downlink frames | The number of PRS downlink frames is used to specify the number $N_{PRS}$ of successive downlink subframes, 1, 2, 4 or 6 successive downlink subframes are possible | M |
| Silence information | Silence information is used to specify PRS silence configuration of the cell in a case of using silence. PRS silence configuration is defined by a periodic PRS silence sequence in a period of $T_{REP}$, $T_{REP}$ calculated based on the number of the PRS positioning situations may be 2, 4, 8 or 16. The silence information may be provided with a bit string (that is, $T_{REP}$) having the | C |

TABLE 3-continued

PRS Information Element

| Element | Definition | Appearance |
|---|---|---|
| | length of 2, 4, 8 or 16. In a case that a bit in the PRS silence sequence is set to be 0, the PRS is in silence in a PRS positioning situation corresponding to the bit. The PRS positioning situation includes N PRS downlink positioning subframes. A first bit in the PRS silence sequence corresponds to a first PRS positioning situation, which is initiated from SFN = 0 of the assistance data reference cell. | |

The OTDOA technology is introduced above, and small cell on/off technology known by the inventor is introduced simply below, which is not necessarily the conventional technology.

With rapid development of the network coverage and data requirements, the scale of a mobile network is increasing growing, the number of network devices, base stations and power systems are multiplied, and energy consumption of a wireless communication network has been a focus in the industry. The base station is a main energy consumption device in the wireless communication network, and the number of base stations increases rapidly with the dramatic increase in the number of users and communication capacity in a cellular communication system, therefore, a key for realizing green communication is to reduce the energy consumption of the base station.

For energy saving on the base station side, like a discontinuous reception (DRX) mechanism on the terminal side, the base station side can also be turned on and turned off dynamically based on an actual capacity requirement, to reasonably allocate the energy consumption and realize energy saving.

The small cell on/off means that a small cell is turned on and turned off adaptively by a network terminal based on an actual network load, interference between cells and the like, to improve network throughput, and save energy consumption of a base station terminal.

In a case that a cell is turned on, the cell transmits various signals required in a normal communication such as a reference signal for cell measurement or data demodulation.

In a case that the cell is turned off, the cell disables most radio frequency functions for saving energy, and does not transmit the reference signal described above. Therefore, some mechanisms are required to be designed by the user to discover such cell. For example, a dedicated cell discovery reference signal (DRS) is used by the user, and the DRS is still transmitted in a duration when the small cell is turned off. However, the mechanisms may be not compatible with a traditional user.

According to discussion in the Rel-12, the small cell on/off is mainly realized by a semi-static on/off scheme.

In the semi-static on/off scheme, the small cell is turned on and turned off in a semi-static manner. The semi-static cell on/off may be based on the increase/decrease in a flow load, arrival and departure of the user, and arrival/completion of a call packet. A switch time for the semi-static cell on/off has a range from a few hundreds of milliseconds to a few seconds based on a traditional process. The switch time for the semi-static cell on/off may be shortened in a case that a relevant process is enhanced.

In a scenario based on a traffic load, an off small cell may be turned on if a traffic load of a neighbour cell or a current cell increases to a certain threshold. Similarly, an on small cell may be turned off if a traffic load of the neighbour cell or the current cell decreases to a certain threshold.

In a scenario based on cell membership of the user, the small cell may be turned off if there is no user in the cell, and the off cell may be turned on if a network terminal determines to switch some users into the off cell. The cell membership of the user is determined by the network terminal based on measurement of the user and a mechanism such as load balancing.

In a scenario based on arrival/completion of a data packet, the off small cell may be turned on if a data packet arrives, and the small cell may be turned off if transmission for the data packet is completed.

It can be seen from the above description that the semi-static small cell on/off scheme may be not only easily implemented from the perspective of standardization, but also can improve network performance and coordinate interference between cells.

Since small cells are deployed densely, a synchronization signal and a reference signal between cells may suffer from serious interference, and a more effective cell discovery mechanism is required in the small cell on/off technology to reduce the switch time of the small cell on/off, therefore, a new reference signal DRS is designed by the 3GPP. Also, the DRS is proposed to facilitate load balancing, interference coordination, radio resource management (RRM) measurement, cell recognition and the like between the dense small cells. It can be seen that the proposed DRS can bring in a series of benefits.

The DRS mainly includes a PSS/SSS and a CRS, and whether a channel state information reference signal (CSI-RS) is contained in the DRS depends on conditions as follows.

If a reference signal receiving power (RSRP)/reference signal receiving quality (RSRQ) measurement report based on the CSI-RS is configured, the DRS contains the PSS/SSS, the CRS and the CSI-RS.

If RSRP/RSRQ measurement report based on the CRS is configured, the DRS contains the PSS/SSS and the CRS.

If the RSPR/RSRQ measurement report based on both the CSI-RS and the CRS are configured, the DRS contains the PSS/SSS, the CRS and the CSI-RS.

For same-frequency measurement and different-frequency measurement, if the UE is configured only with measurement report based on the DRS in a given frequency, and the UE is not configured for any active serving cell in the frequency, the UE only pays attention to the DRS in a DRS measurement timing configuration (DMTC), and ignores any other signals and channels.

In addition, the DRS is only transmitted in a downlink subframe or a downlink pilot time slot (DwPTS) region of the subframe. The DRS is composed of N (N≤5) successive subframes, and includes one PSS/SSS, and the CRS is arranged in a same subframe as the SSS. One DRS may have multiple RE configurations for the CSI-RS, the CSI-RS subframe has an offset from the SSS subframe. The DRS is transmitted at a time interval of M milliseconds, a value of M may be 40, 80 or 160.

For the DRS measurement process, the DRS is measured by the UE mainly based on a DMTC transmitted by the base station, the DMTC is configured as follows.

One DMTC is configured in each frequency of the UE, and a reference time for an offset of the DMTC is a time of a primary cell.

A period M of the DMTC has an alternative value of [40, 80 and 160], and an offset L of the DMTC has an alternative value of [0,1,..., M-1].

In addition to the period and the offset, the UE is informed of a frequency, i.e., a measurement bandwidth by radio resource control (RRC), the UE regards the measurement bandwidth is the same as a system bandwidth.

A length of the DMTC is defined to be 6 milliseconds.

In order to be compatible with the traditional CRS measurement, the UE is configured with both the DRS measurement and the CRS measurement, the UE can perform the two measurement in parallel. In new discussion of the RAN2, the CRS measurement may be directly compared with the DRS measurement, or may become comparable with the DRS measurement (depending on whether the DRS includes the CSI-RS) after conversion.

In addition, if a configuration signal of the DRS measurement is transmitted, the UE continues performing DRS measurement, no matter whether the UE is in the DRX. The UE in an on or off cell may be configured with the DRS detection and a RRM measurement process.

Contents related to the small cell on/off technology are described above, and the technical problem faced by the present disclosure is introduced next.

It can be known according to the research that in the OTDOA technology, the UE measures a RSTD of a serving cell and a cell in the neighbour cell information list (Neighbour Cell Info list) provided by the location server based on the Neighbour Cell Info list, and report the RSTD to the location server for positioning. In the indoor scenario, wall penetration loss will cause large attenuation on strength of a signal. Therefore, the PRS should be enhanced to confront the indoor environment. In addition, in an indoor scenario where the small cells are deployed densely, an interference coordination problem of the PRS should be solved. Related configuration of the PRS is also affected by the introduction of the small cell on/off, and problems as follows should be solved in a case that the OTDOA technology is introduced into the indoor scenario.

In the small cell on/off scenario, a small cell is turned off or turned on at times. In a case that a ratio of the number of the off cells to the number of cells is large, interference between PRS signals transmitted by the on cells is reduced. Since a period of the PRS also affects detection of the UE for PRSs of respective small cells, the period of the PRS is adjusted when the number of the off cells changes, to change sparseness of the PRSs, and therefore improve measurability of the PRSs. Therefore, a configuration problem of the period of the PRS is solved according to a long-term on/off situation of the small cell.

In addition, in an indoor deployment scenario of the small cells, the small cells may adopt a same frequency, and frequency coincidence of the PRSs results in the increase in interference between PRSs of the small cells. Therefore, PRS muting technology is used to solve the interference problem between the PRSs. In addition, when a small cell is turned off, the time-frequency resource of the small cell for transmitting the PRS becomes an idle resource. If the idle resource is not utilized, the time-frequency resource for the PRS is wasted, and positioning coverage problem of the PRS is affected, and the UE cannot have a good positioning effect. Therefore, the idle resource is used by a small cell which is not turned off to improve a coverage range and measurability of the PRS, but an allocation problem of the time-frequency resource should be solved.

In addition, in a case that a large number of small cells are turned off, some UEs are unable to measure PRSs for enough small cells, and therefore the UEs are not positioned successfully. In this case, some off small cells transmit the PRS while transmitting the DRS to assist in positioning. However, in a case that the off small cell transmits the PRS, not only energy consumption of the off small cell will be affected, but also the existing small cell off mechanism is impacted. Therefore, the PRS is added into the DRS in the present disclosure to ensure transmitting of the PRS. However, how to add the PRS into the DRS while ensuring that the two does not affect with each other is a problem to be solved, and how to select an off small cell for transmitting the PRS is also a problem to be considered.

An OTDOA positioning technical solution based on a reconfigured PRS is provided in the present disclosure, to solve a compatibility problem between the small cell on/off technology and the OTDOA technology, and realize a better positioning effect. The present disclosure is particularly suitable for a scenario where the small cells are deployed densely, for example an indoor positioning scenario.

FIG. 1 shows a structure of an electronic device 100 in a wireless communication system according to the embodiments of the present disclosure. As shown in FIG. 1, the electronic device 100 may include a processing circuit 110. It should be illustrated that the electronic device 100 may include one processing circuit 110, or may include multiple processing circuits 110. In addition, the electronic device 100 may further include a communication unit 120 and the like.

Further, the processing circuit 110 may include various discrete functional units to perform various different functions and/or operations. It should be noted that the functional units may be a physical entity or a logic entity, and units having different names may be implemented by a same physical entity.

For example, as shown in FIG. 1, the processing circuit 110 may include an acquisition unit 111 and a generation unit 112.

The acquisition unit 111 may be configured to acquire an on/off state of a small cell base station within a predetermined geographical region.

The generation unit 112 may be configured to generate, based on the on/off state of the small cell base station acquired by the acquisition unit 111, reconfiguration information of a PRS for the small cell base station within the predetermined geographical region, to position a UE within the predetermined geographical region.

With the electronic device 100 according to the embodiment of the present disclosure, the PRS may be reconfigured based on the on/off state of the small cell base station, to position the UE. In this way, even if the small cell base station is switched between the on-state and the off state and the off small cell base station does not transmit the PRS, the reconfigured PRS may be used for positioning, thereby realizing the compatibility of the small cell on/off technology with the OTDOA technology without greatly affecting the operation mode of the existing system, and realizing a better indoor positioning effect, for example.

According to the embodiment of the present disclosure, the reconfiguration information of the PRS may include a PRS transmission period of an on small cell base station (that is, in an on-state). Furthermore, the processing circuit 110 (for example the generation unit 112) may adjust the PRS transmission period of the on small cell base station based on a ratio of the number of off small cell base stations within the predetermined geographical region to the number of small cell base stations within the predetermined geographical region.

Preferably, the processing circuit 110 may reduce the PRS transmission period of the on small cell base station in a case that the above ratio is greater than a first threshold, and the processing circuit 110 may increase the PRS transmission period of the on small cell base station in a case that the above ratio is less than a second threshold.

Specifically, in the small cell on/off scenario, a configuration for the PRS period may be related to a ratio of the number of off small cells within a macro cell to the number of small cells within the macro cell. Interference between PRSs transmitted by on small cells is reduced with the increase of the ratio of the number of the off small cells. Since the traditional PRS period is set assumed that all small cells are in an always-on-state, the PRS period is too large in a case that the number of the off small cells reaches to a certain number, which results in wasting resources. Therefore, the PRS period of the small cell may be set under consideration of the on/off states of the small cells within the macro cell.

For example, the PRS period is reduced in a case that the ratio of the number of the off small cells increases to a certain threshold, and similarly the PRS period is increased in a case that the ratio of the number of the off small cells reduces to a certain threshold. It should be noted here that the ratio of the number of the off small cells within the macro cell is obtained by averaging for a large time period. A change in the ratio of the number of the off small cells is not large with taking the macro cell as a whole if the small cells are turned on or turned off frequently for a long time period, in this case, the PRS period does not change frequently.

In some special situations, however, for example, in a case that several days of major meetings are hold in a building suddenly, the ratio of the number of the off small cells greatly reduces to below a certain threshold, and keeps for a long time. The macro cell adjusts the PRS period when detecting a great change in the ratio of the number of the long-term off small cells, and notifies all small cells within a coverage range thereof.

According to a preferred embodiment of the present disclosure, the reconfiguration information of the PRS may include PRS configuration assistance information of an off small cell base station within the predetermined geographical region. Further, the processing circuit 110 (for example the generation unit 112) may allocate a time frequency resource of the off small cell base station for transmitting the PRS as an idle resource to an on small cell base station.

According to the preferred embodiment of the present disclosure, the processing circuit 110 (for example the generation unit 112) may allocate the idle resource to the on small cell base station based on a priority level of the on small cell base station.

According to the preferred embodiment of the present disclosure, the processing circuit 110 (for example the generation unit 112) may determine the priority level by determining a on small cell base station for positioning respective UEs based on rough geographical locations of the respective UEs, counting the number of occurrence of the on small cell base station for positioning the respective UEs within a predetermined time period, and determining the priority level based on a result of the counting.

According to the preferred embodiment of the present disclosure, the reconfiguration information of the PRS may include blending information indicating that the PRS is configured in a DRS. Further, the processing circuit 110 (for example the generation unit 112) may generate the blending information based on the number of occurrence of an off small cell base station for positioning the respective UEs within a predetermined time period.

According to the preferred embodiment of the present disclosure, the blending information may include location information indicating a configuration location of the PRS in the DRS. Further, the processing circuit 110 (for example the generation unit 112) may generate location information based on configuration information of the DRS.

It should be illustrated that, according to the embodiments of the present disclosure, the wireless communication system described above may be a long term evolution-advanced cellular (LTE-A) cellular communication system, the electronic device 100 may be a location server in a core network, and the electronic device 100 may further include a communication unit 120 and the like. The communication unit 120 may for example receive related information from the base station and/or transmits related information to the base station.

Figure 2:
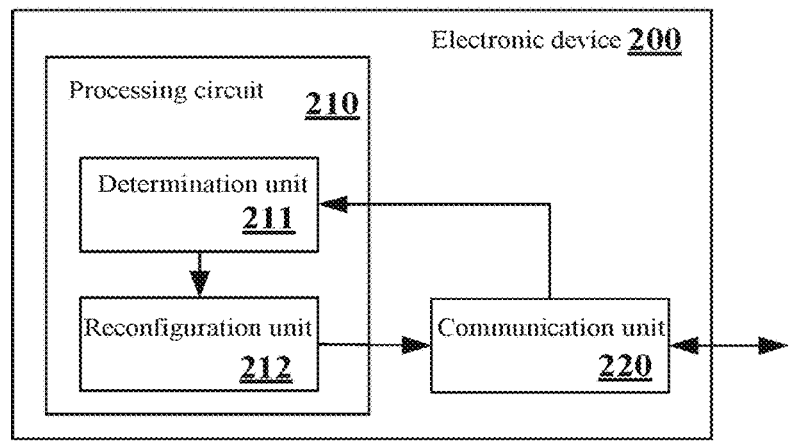
FIG. 2 is a structural block diagram of an electronic device in a wireless communication system according to another embodiment of the present disclosure.

An electronic device on a side of a base station in a wireless communication system is described in detail below. FIG. 2 shows a structure of an electronic device 200 in the wireless communication system according to an embodiment of the present disclosure.

As shown in FIG. 2, the electronic device 200 may include a processing circuit 210. It should be illustrated that the electronic device 200 may include one processing circuit 210, or may include multiple processing circuits 210. In addition, the electronic device 200 may further include a communication unit 220 and the like.

As described above, similarly, the processing circuit 210 may include various discrete functional units to execute various different functions and/or operations. The functional units may be a physical entity or a logic entity, and units having different names may be implemented by a same physical entity.

As shown in FIG. 2, the processing circuit 210 may include a determination unit 211 and a reconfiguration unit 212.

The determination unit 211 may be configured to determine reconfiguration information of a PRS from a control device. The reconfiguration information of the PRS here may include blending information indicating that the PRS is configured in a DRS.

The reconfiguration unit 212 may be configured to reconfigure the DRS based on the blending information, to position a UE.

Preferably, the blending information may include location information indicating a configuration location of the PRS in the DRS. Further, the processing circuit 210 (for example the reconfiguration unit 212) may be configured to reconfigure the DRS based on the location information.

Preferably, the processing circuit 210 (for example the reconfiguration unit 212) may configure the PRS to occupy 1, 2 or 4 subframes in the DRS.

Preferably, the processing circuit 210 (for example, the reconfiguration unti 212) may configure a period of the PRS to be n times of a period of the DRS, where n is a natural number.

It should be illustrated that, according to the embodiment of the present disclosure, the wireless communication system described above may be an LTE-A cellular communication system, the electronic device 200 may be a small cell base station in an off state in the wireless communication system, and the electronic device 200 may further include a transceiver (for example the communication unit 220) to transmit the DRS via an air interface.

Figure 3:
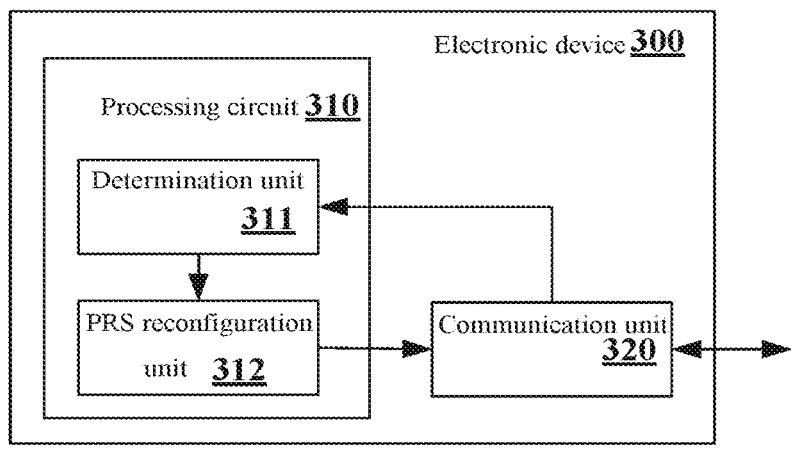
FIG. 3 is a structural block diagram of an electronic device in a wireless communication system according to another embodiment of the present disclosure.

FIG. 3 shows a structure of an electronic device 300 in a wireless communication system according to an embodiment of the present disclosure.

As shown in FIG. 3, the electronic device 300 may include a processing circuit 310. It should be illustrated that the electronic device 300 may include one processing circuit 310, or may include multiple processing circuits 310. In addition, the electronic device 300 may further include a communication unit 320 and the like.

As described above, similarly, the processing circuit 310 may include various discrete functional units to execute various different functions and/or operations. The functional units may be a physical entity or a logic entity, and units having different names may be implemented by a same physical entity.

As shown in FIG. 3, the processing circuit 310 may include a determination unit 311 and a PRS reconfiguration unit 312.

The determination unit 311 may be configured to determine reconfiguration information of a PRS from a control device. The reconfiguration information of the PRS here may include PRS configuration assistance information of an off small cell base station.

The PRS reconfiguration unit 312 may be configured to reconfigure the PRS based on the PRS configuration assistance information of the off small cell base station, to position a UE using a time frequency resource of the off small cell base station for transmitting the PRS as an idle resource.

Preferably, the PRS configuration assistance information may be specific location information on a resource element for transmitting the PRS by the off small cell base station.

Preferably, the PRS configuration assistance information may be PRS configuration information of the off small cell base station.

Preferably, the processing circuit 310 (for example, the PRS reconfiguration unit 312) may be configured to: determine resource release information from the control device, wherein the resource release information indicates that the off small cell base station has been turned on; and reconfigure the PRS based on the resource release information, to release the time frequency resource of the off small cell base station for transmitting the PRS.

It should be illustrated that, according to the embodiment of the present disclosure, the wireless communication system described above may be the LTE-A cellular communication system, the electronic device 300 may be a small cell base station in an on-state in the wireless communication system, and the electronic device 300 may further include a transceiver (for example, a communication unit 320) to transmit the PRS via an air interface.

Figure 4:
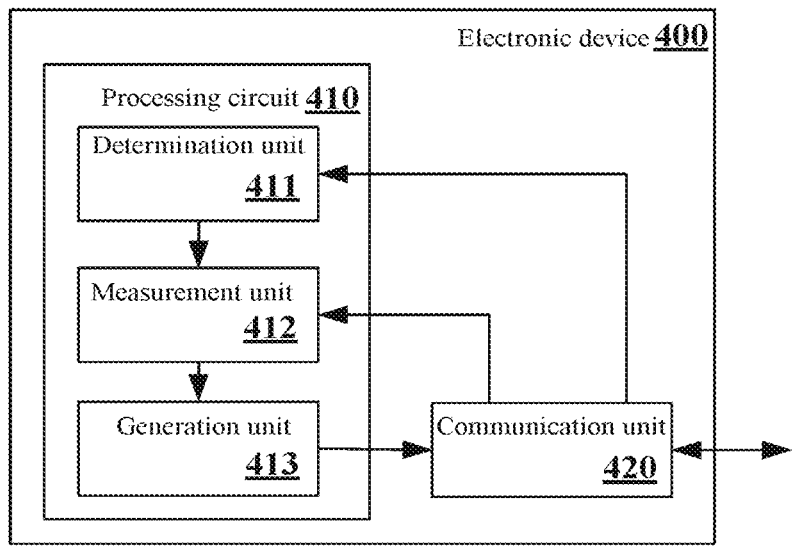
FIG. 4 is a structural block diagram of an electronic device in a wireless communication system according to another embodiment of the present disclosure.
Figure 5A:
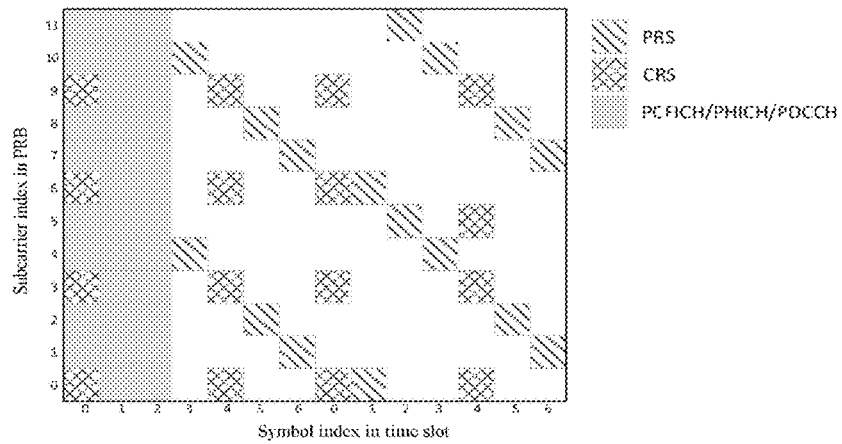
FIG. 5(*a*) to FIG. 5(*d*) are schematic diagrams of examples for reallocating a time frequency resource block of a PRS.
Figure 5B:
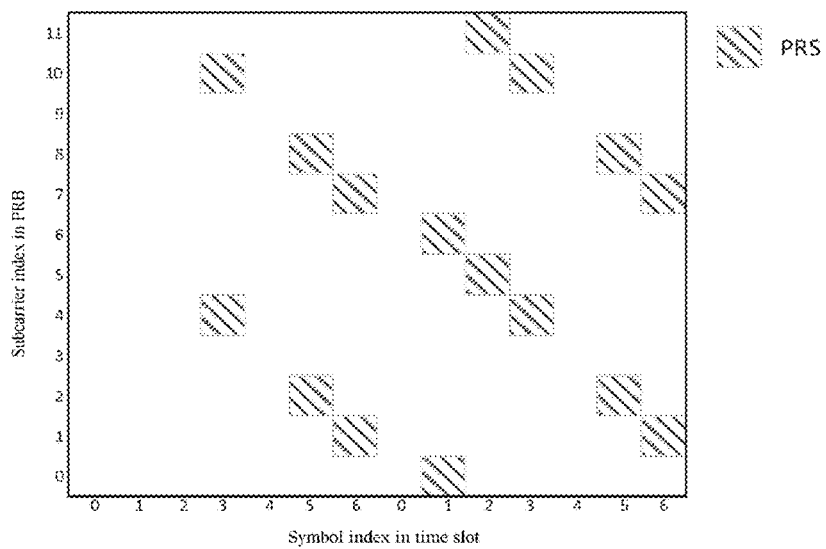
Figure 5C:
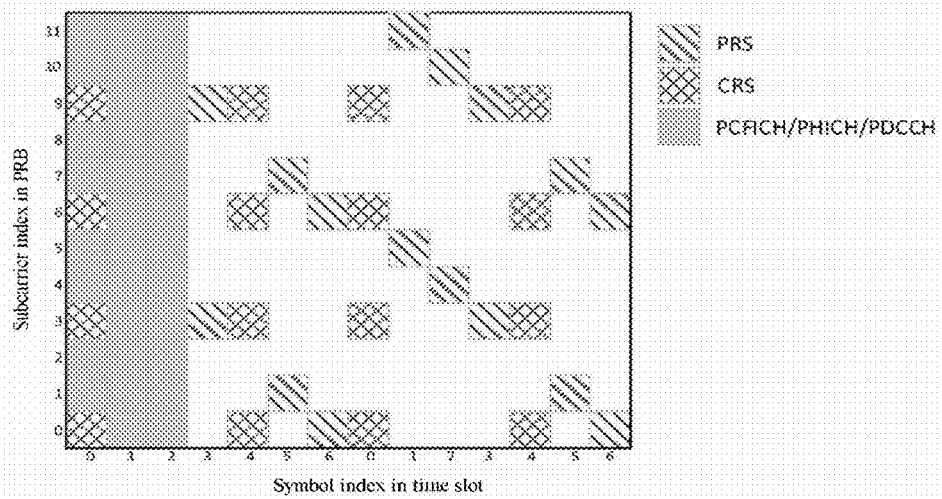
Figure 5D:
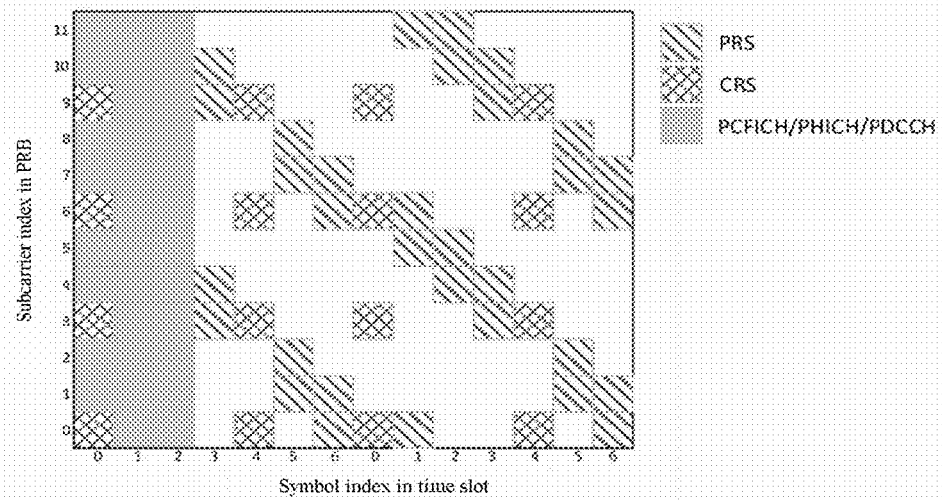

An electronic device on a side of a UE in a wireless communication system is described in detail next. FIG. 4 shows a structure of an electronic device 400 in a wireless communication system according to an embodiment of the present disclosure.

As shown in FIG. 4, the electronic device 400 may include a processing circuit 410. It should be illustrated that the electronic device 400 may include one processing circuit 410, or may include multiple processing circuits 410. In addition, the electronic device 400 may further include a communication unit 420 and the like.

As described above, similarly, the processing circuit 410 may include various discrete functional units to execute various different functions and/or operations. The functional units may be a physical entity or a logic entity, and units having different names may be implemented by a same physical entity.

As shown in FIG. 4, the processing circuit 410 may include a determination unit 411, a measurement unit 412 and a generation unit 413.

The determination unit 411 may be configured to determine positioning measurement assistance data for a UE. Here, the positioning measurement assistance data may include reconfiguration information of a PRS for a small cell base station.

The measurement unit 412 may be configured to perform positioning measurement on a PRS transmitted by the small cell base station based on the positioning measurement assistance data.

The generation unit 413 may be configured to generate positioning information based on a result of the performing the positioning measurement on the PRS transmitted by the small cell base station, to position the UE.

Preferably, the reconfiguration information of the PRS may include a PRS transmission period of an on small cell base station.

Preferably, the reconfiguration information of the PRS may include blending information indicating that the PRS is configured in a DRS transmitted by an off small cell base station.

Preferably, the processing circuit 410 (for example, the measurement unit 412) is further configured to detect the DRS of the off small cell base station, to extract the PRS from the DRS for performing the positioning measurement.

It should be illustrated that, according to an embodiment of the present disclosure, the wireless communication system described above may be an LTE-A cellular communication system, the electronic device 400 may be a UE in the wireless communication system, and the electronic device 400 may further include a transceiver (for example the communication unit 420), to receive the positioning measurement assistance data from a network device and transmit the positioning information to the network device.

The electronic devices in the wireless communication system according to the embodiments of the present disclosure are described above in conjunction with FIG. 1 to FIG. 4. The technical solution according to the present disclosure is further described below in detail in conjunction with an embodiment.

A resource coordination mechanism in a small cell on/off state is described first.

When one or more small cells are turned off, time frequency resources of the one or more small cells for transmitting a PRS is in an idle state. If the small cells are turned off for a long time, the time frequency resource is wasted. Therefore, a resource coordination mechanism in the small cell on/off state is disclosed in the present disclosure, to allocate an idle resource to other on small cell (that is, a small cell in an on-state) to use, and therefore increase a coverage range of the PRS of the on small cell, and improve a receiving ratio of the UE for the PRS, and ensure the coverage for the UE, so that the UE can realize a better positioning effect. The resource coordination mechanism has steps of initial coordination of a cell set, determination of a neighbour cell information list (Neighhour Cell Info list), creation of a cell priority list, maintenance of a time frequency resource pool list and coordination of PRS time frequency resource blocks of the off small cells.

1) In the initial coordination of a cell set, first, a set of cells (which may be a set composed of multiple macro cells, or may be a small cell cluster, the small cell set is taken as an example below for description) within a certain range is created by a location server, and the set of cells is configured as follows: in the set of cells, for cells having a same PRS mode (that is, PRSs of the cells have a same frequency offset), when one of the cells transmits a PRS (or should transmit the PRS), other small cells having the same mode as the cell are configured to keep in silence of a PRS (PRS silence mechanism). The PRS mode is related to a cell ID, for example, cells having a same value obtained by the cell ID mod 6 have the same PRS mode. In this way, it ensures that no serious interference is caused when other small cell reuses the PRS time frequency resource of the off cell (that is, a cell in an off state).

2) In determination of neighbour cell information list (Neighhour Cell Info list), when there is a UE is required to be positioned for example in the range of the small cell cluster, there may be multiple measurement cells for measuring the PRS around the UE, and topologies of different measurement cells affects a positioning accuracy of the UE, therefore, the location server determines a measurement small cell corresponding to the UE, and transmits information on the measurement small cell to the UE through the OTDOA Neighbour Cell Info list. The measurement small cell for the UE may be determined as follows.

First, a serving cell of the UE determines an approximate location of the UE and an orientation of the UE with respect to the serving cell through enhanced cell-ID (E-CID), and the serving cell transmits these approximate geographical information to the location server.

Since the location server can acquire a geographical location of each small cell, the location server can select a measurement cell suitable for the UE based on the geographical information of the UE, so that the UE is located at a geometric center of all measurement cells as much as possible, and as many measurement cells as possible are selected to further improve the positioning accuracy.

The location server transmits the selected measurement cells to the UE through the OTDOA Neighbour Cell Info list.

It should be noted that, after the UE is positioned, the location server may also verify whether a positioning result of the UE is reasonable by the acquired approximate geographical information positioning of the UE above. If the positioning result of the UE is unreasonable, the location server may reselect a measurement cell, and inform the UE to be positioned again.

3) In the creation of a small cell priority list, after acquiring the OTDOA Neighbour Cell Info list of each positioned UE, the location server creates and maintains a small cell priority list for transmitting the PRS for the set of the small cells.

A priority level of the small cell for transmitting the PRS is affected by the number of occurrence of an ID of the respective small cells in the OTDOA Neighbour Cell Info lists of all UEs within a converge range of the set of small cells in a predetermined time window. It can be seen that a priority level of a small cell for transmitting the PRS is raised with an increase in the number of occurrence of the small cell in the OTDOA Neighbour Cell Info lists of all UEs.

4) In maintenance of a time frequency resource pool list, the location server or for example a macro base station for managing multiple cells maintains a PRS time frequency resource pool of an off small cell.

PRS information in the Neighbour Cell Info list may include a PRS bandwidth, a PRS configuration index, the number of PRS downlink frames, silence information and other information. A PRS time frequency resource block of each small cell, that is, a time and a carrier frequency for transmitting the PRS, can be obtained based on the PRS information. FIG. 5(*a*) shows positions of resource blocks such as a PRS, a CRS, a physical control format indicator channel (PCFICH)/physical hybrid ARQ Indicator Channel (PHICH)/physical downlink control channel (PDCCH) carried by a certain cell in a certain time in a positioning subframe, in which no data is contained in a blank region. The resource block of the PRS may be extracted from the resource blocks, as shown in FIG. 5(*b*).

All the extracted PRS time frequency resource block of the off small cell may be stored in a PRS time sequence resource pool of the off small cell. Once a new small cell goes into an off state, a PRS time frequency resource of the small cell is put into the resource pool. In another aspect, once an off small cell is turned on, the PRS time frequency resource block in the resource pool which belongs to the small cell originally is released, and the small cell which is turned on transmits a PRS in a previous PRS mode.

5) In the coordination of PRS time frequency resource blocks of the off small cells, if the PRS time frequency resource pools of the off small cells in the set of small cells are not empty, the on small cell in the set of small cells can utilize the PRS time frequency resources in the resource pool. The PRS time frequency resources in the resource pool are allocated to the on small cells in the set of small cells according to the priority list of the small cells for transmitting the PRS defined in the step 3). The allocation scheme is described above:

allocating a first PRS time frequency resource in the resource pool to a small cell ranked at the top of the priority list first, and marking the small cell as allocated;

allocating a second PRS time frequency resource in the resource pool to a small cell ranked in the second place of the priority list, and marking the small cell; and repeating the above step until all the PRS time frequency resources in the resource pool are allocated.

FIG. 5(*c*) and FIG. 5(*d*) are schematic diagrams showing allocating the PRS time frequency resource blocks. Assumed that a positioning subframe in a case that no additional PRS time frequency resource block is allocated to a certain on small cell within the set of small cells is as shown in FIG. 5(*c*). Further assumed that in a case that the on small cell acquires one PRS time frequency resource block in the resource pool, the PRS time frequency resource block is schematically shown in FIG. 5(*b*).

In an example, an original PRS transmission time of the off small cell is in a same subframe as that of the on small cell, a positioning subframe after the PRS time frequency resource block is allocated is shown in FIG. 5(*d*).

Since PRSs between different small cells are generally synchronous, the above situations accounts for a large proportion. If the on small cell and the off small cell adopt a PRS muting mechanism for transmitting the PRS, for example, if the on small cell and the off small cell have a same PRS mode, a time corresponding to the PRS time frequency resource block of the off small cell may be in a different subframe from that of the on small cell. In the example of the present disclosure, the PRS time frequency resource block of the off small cell is allocated to the on small cell having a same PRS mode as the off small cell, in this way, the number of the positioning subframes of the on small cell increases, and measurability of the PRS can be enhanced.

According to definition in step 1), since the small cells having a same PRS mode in the set of small cells adopt the PRS muting mechanism when transmitting the PRS, no serious interference is caused when the on small cell reuses the PRS time frequency resource of the off cell.

The resource coordination mechanism avoids the time frequency resource from being wasted due to that the small cell is in the off state, increases a PRS transmission resource of the on small cell, improves a receiving ratio of the UE for the PRS, ensures coverage for the UE to some extent, increases measurability of the PRS and improves a positioning accuracy and a positioning speed for the UE.

An assistant positioning mechanism of the off small cell is described below.

When a certain small cell enters the off state, the small cell does not transmit a PRS, and in some cases, a UE requires the PRS of the small cell for accurate positioning. Therefore, in the present disclosure, the PRS is blended into a DRS in a case of meeting a certain condition, to realize assistant positioning. A CRS in the DRS may also assist in positioning.

In an off state of the small cell, a first subframe in a radio frame is used to transmit a PSS/SSS, and a CSI-RS may be transmitted in a second subframe to a fifth subframe, or may not be transmitted. The location server determines an on/off state, a period and location configuration of PRS of the off small cell according to certain rules, and transmits (directly or indirectly via a macro base station) the information on the on/off state, the period and the location configuration of the PRS of the off small cell to the off small cell via for example an S1 signaling.

The location server may for example maintain a counter for each off small cell in a memory, the counter is used to count the number N of occurrence of the small cell in all Neighbour Cell Info lists of the location server within a time period.

For an on/off condition of the PRS, when a certain off small cell which does not transmit a PRS meets N≥N0 (N0 is for example a natural number determined based on empirical values), the location server transmits PRS configuration signaling to the small cell, and the small cell starts to transmit a PRS in next period.

Furthermore, in a case that a certain off small cell which transmits a PRS meets N<N0−ΔN, the location server transmits signaling for stopping transmitting PRS to the small cell, and the small cell stops transmitting the PRS in a next signal period. ΔN is a fixed constant (for example a natural number determined based on empirical values).

In a case that a certain off small cell meets a transmission condition of a PRS, a configuration scheme for transmitting the PRS by the off small cell for example may be:

in a case of N0≤N<N1(N1 is a natural number determined based on empirical values), one subframe in each DRS is configured for the PRS;

in a case of N1≤N<N2(N2 is a natural number determined based on empirical values), two subframes are configured for the PRS; and in a case that N≥N2 and the off small cell does not transmit a CSI-RS, four subframes are configured for the PRS, and in a case that N≥N2 and the off small cell transmits the CSI-RS, two subframes are configured for the PRS.

According to the above example, more PRS positioning subframes are contained in the DRS configured for the off small cell in a case that more UEs are suitable to be positioned by the PRS of the off small cell, and less PRS positioning subframes are contained in the DRS configured for the off small cell in a case that less UEs are suitable to be positioned by the PRS of the off small cell, therefore, a receiving ratio of the UE for the PRS of the off small cell can be improved, and interference can be balanced.

The PRS may be carried in other subframes except subframes of the PSS/SSS, CRS and the CSI-RS (if any). One configuration method is to put the PRS into empty subframes from a zeroth subframe of the DRS of the off small cell base station, until all subframes of the PRS are configured.

In addition, a PRS period is configured to be M (M≥1) times of a period of the DRS. According to the technical solution of the present disclosure, a duration of the DRS is at most extended to be 5 ms, therefore, 6 ms of the DMTC may remain unchanged.

When a UE requiring measuring a positioning signal measures the off small cell, a measurement configuration of the UE is the same as that of the DMTC. When an enough strong CRS is measured, the CRS can be served as the positioning signal together with the PRS.

With the mechanism described above, a defect that the UE is unable to be positioned in a case that a large number of small cells are turned off is remedied, so that the off small cell can acquire a better energy saving effect while meeting indoor positioning performance for the UE.

A signal interaction flow between a base station side and a user side in a wireless communication system according to an embodiment of the present disclosure is described in detail below in conjunction with FIG. 6 to FIG. 8.

Figure 6:
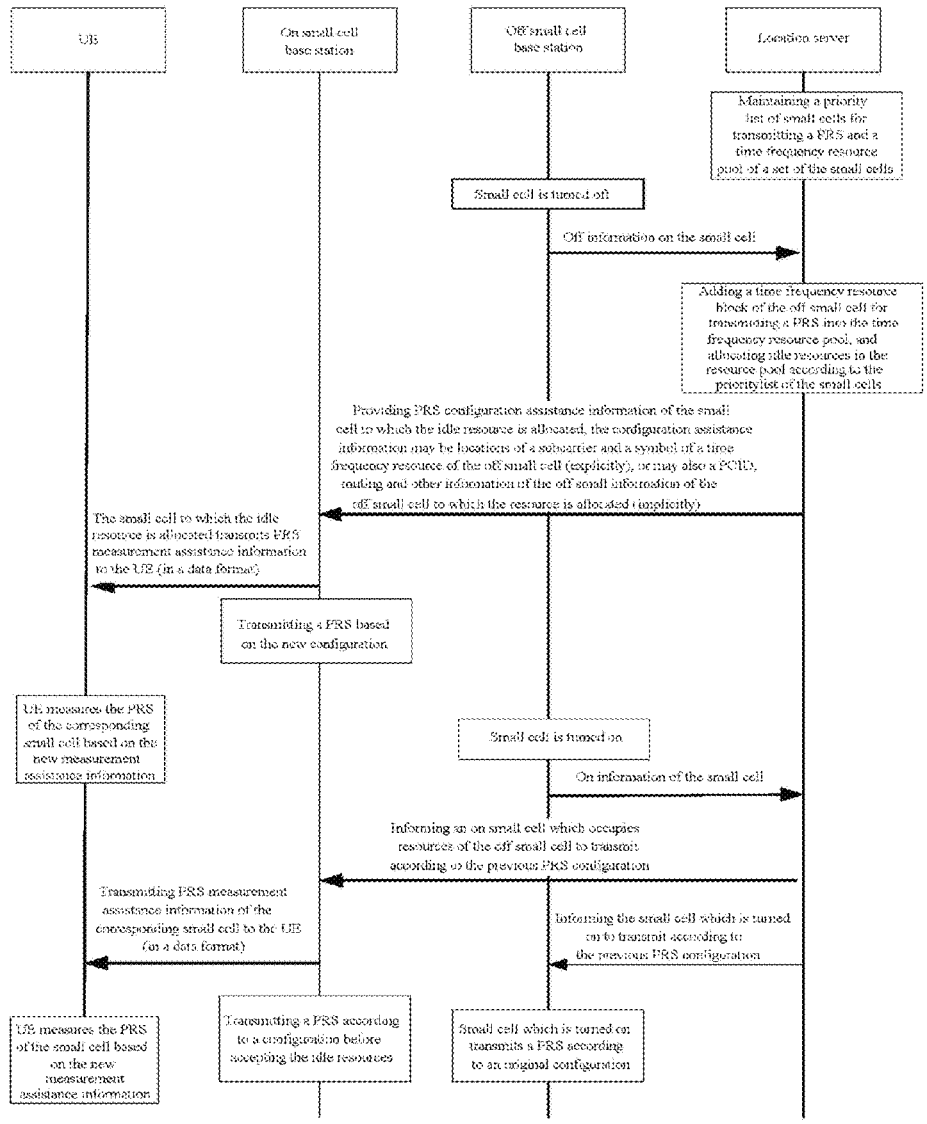
FIG. 6 is a sequence diagram of a wireless communication method in a wireless communication system according to an embodiment of the present disclosure.

FIG. 6 is a sequence diagram of a wireless communication method in a wireless communication system according to an embodiment of the present disclosure. A signaling flow of a coordination mechanism for an idle resource is shown in FIG. 6.

As shown in FIG. 6, a location server may maintain a priority list of small cells for transmitting a PRS and a PRS time frequency resource pool of a set of the small cells.

A small cell base station (an off small cell base station in FIG. 6) turns off a small cell due to some reasons (for example as described above), and transmits off information on the small cell to the location server.

Upon receiving the off information on the small cell from the small cell base station, the location server adds a time frequency resource block of the off small cell for transmitting a PRS into the time frequency resource pool, and allocates idle resources in the resource pool according to the priority list of the small cells.

The location server may provide PRS configuration assistance information of a small cell to which the idle resource is allocated, to an on small cell base station. The configuration assistance information may be locations of a subcarrier and a symbol of a time frequency resource of the off small cell (for explicitly indicating the resource), or may also a PCID, muting and other information of the off small cell (for implicitly indicating the resource according to a predetermined relation of a PCID and the like with a resource), the resource of which is allocated.

The on small cell base station to which the idle resources are allocated may transmit PRS measurement assistance information to the UE (for example, in a data format carried in a PDSCH). In addition, the corresponding on small cell base station may transmit a PRS based on the new configuration.

The UE may measure the PRS of the corresponding on small cell base station based on the new measurement assistance information.

In the meantime, when the off small cell bases station is turned on, the off small cell base station may transmits on information of the small cell to the location server.

Upon receiving the on information of the small cell, the location server may inform an on small cell which occupies resources of the off small cell and the small cell which is turned on to transmit according to an original PRS configuration, that is, the on small cell releases the PRS transmission resources of the small cell which is turned on, so that such small cell may continually utilize the PRS transmission resource.

The on small cell base station may then transmit PRS measurement assistance information or a reset indication corresponding to the small cell to the UE (in a data format).

The on small cell may transmits a PRS based on a configuration in which the idle resources have not been accepted, and the small cell which is turned on may transmit a PRS according to an original configuration.

The UE may then measure the PRS of the corresponding small cell based on the new measurement assistance information or the original configuration.

Figure 7:
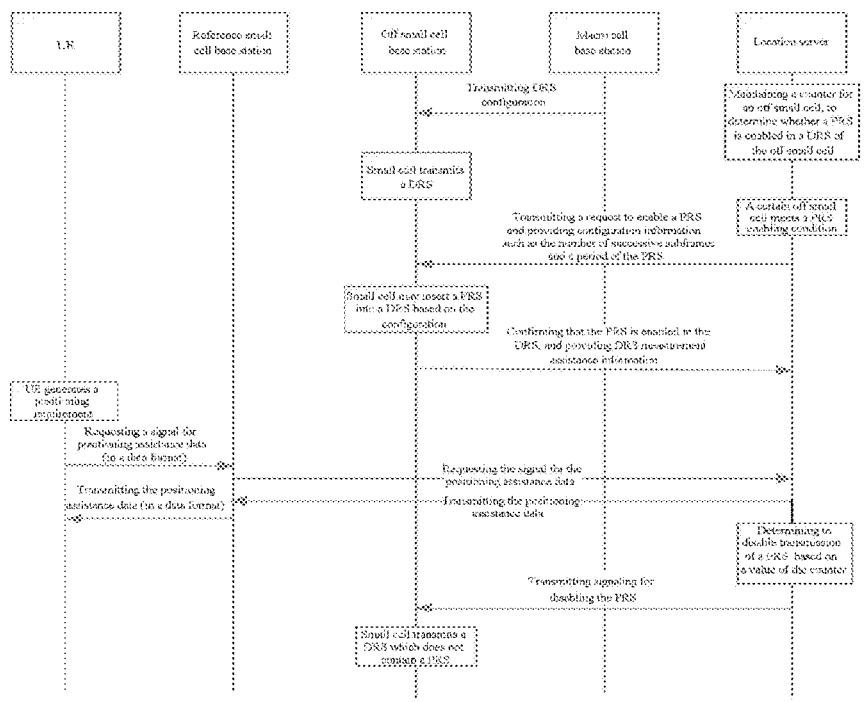
FIG. 7 is a sequence diagram of a wireless communication method in a wireless communication system according to another embodiment of the present disclosure.

FIG. 7 is a sequence diagram of a wireless communication method in a wireless communication system according to another embodiment of the present disclosure. FIG. 7 shows an example of a signaling flow of an off small cell assistance positioning mechanism. It should be illustrated that the off small cell assistance positioning mechanism shown in FIG. 7 is used for a different application scenario from the idle resource coordination mechanism shown in FIG. 6. Specifically, the idle resource coordination mechanism is used for a scenario that the time frequency resources are wasted since the small cell is off for a long time, and the off small cell assistance positioning mechanism is used for a scenario that some UEs requires a PRS of an off small cell to be positioned accurately. In the technical solution of the present disclosure, the off small cell assistance positioning mechanism or the idle resource coordination mechanism may be used independently, or the off small cell assistance positioning mechanism and the idle resource coordination mechanism can be used in a combination way, which is not limited in the present disclosure.

As shown in FIG. 7, a location server may maintain a counter for an off small cell, to determine whether a PRS is blended in a DRS of the off small cell.

In the meantime, a macro cell base station transmits DRS configuration to an off small cell base station. The off small cell base station may transmits a DRS.

The location server may for example determine that a certain off small cell meets a PRS enabling condition, and then the location server may transmit a request to enable a PRS to the off small cell base station, and provide configuration information such as the number of successive subframes and a period of the PRS.

The off small cell base station may insert a corresponding PRS into a DRS based on the configuration. The off small cell base station may confirm that the PRS is blended in the DRS, and provide DRS measurement assistance information to the location server.

When a UE generates a positioning requirement, the UE may transmits a signal for requesting positioning assistance data to a serving base station thereof for example a reference small cell base station (in a data format), and the reference small cell base station may then transmit a signal for requesting the positioning assistance data to the location server.

The location server may transmit the positioning assistance data to the reference small cell base station, and the reference small cell base station may transmit the positioning assistance data to the UE (in a data format). A subsequent positioning measurement signaling flow is well-known for those skilled in the art, which is not described repeatedly here.

In addition, the location server may also determine to disable transmission of a PRS based on a value of the counter. When the transmitting for turning off the PRS is determined, the location server may transmit signaling for disabling the PRS to the off small cell base station.

The off small cell base station then transmits a DRS signal which does not contain a PRS.

Figure 8:
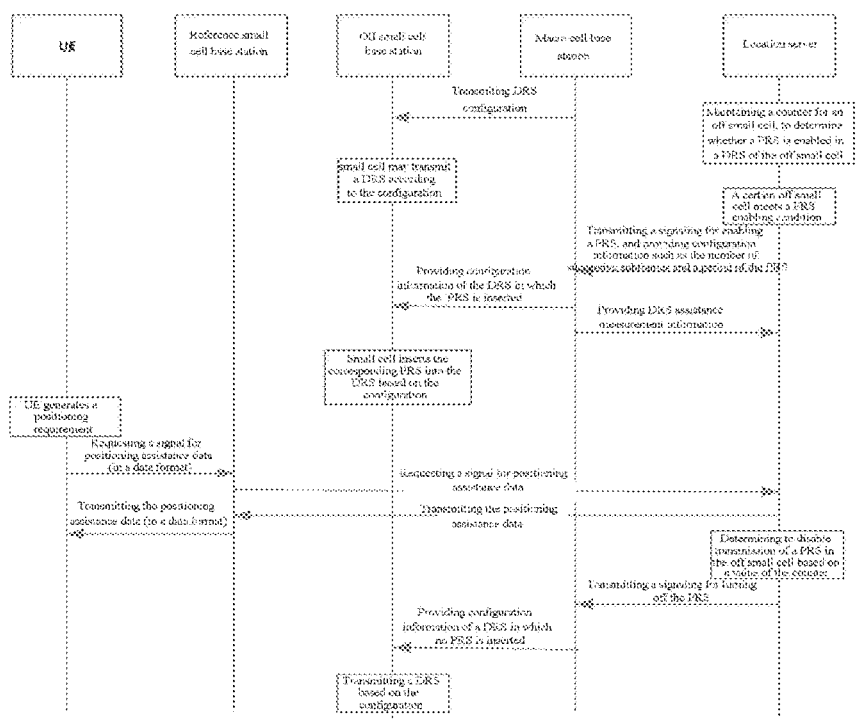
FIG. 8 is a sequence diagram of a wireless communication method in a wireless communication system according to another embodiment of the present disclosure.

FIG. 8 is a sequence diagram of a wireless communication method in a wireless communication system according to another embodiment of the present disclosure. FIG. 8 shows another example of a signaling flow of the off small cell assistance positioning mechanism. It should be illustrated that, the location server may directly communicate with the off small cell base station in the off small cell assistance positioning mechanism shown in FIG. 7, and the location server may communicate with the off small cell base station through a macro cell base station in the off small cell assistance positioning mechanism shown in FIG. 8, which is not limited in the present disclosure.

As shown in FIG. 8, the location server may maintain a counter for an off small cell, to determine whether to contain a PRS in a DRS of the off small cell.

In the meantime, the macro cell base station transmits DRS configuration to an off small cell base station, and the off small cell base station may transmit a DRS.

Then, the location server may for example determine that a certain off small cell meets a PRS enabling condition, and then the location server may transmit signaling for enabling a PRS to the macro cell base station, and provide configuration information such as the number of successive subframes and a period of the PRS.

The macro cell base station may then provide configuration information of the DRS in which the PRS is inserted to the off small cell base station, and may provide DRS measurement assistance information to the location server.

The off small cell base station may insert a corresponding PRS into the DRS based on the configuration.

In the meantime, when a UE generates a positioning requirement, the UE may transmit a signal for requesting positioning assistance data to a reference small cell base station (in a data format). The reference small cell base station may transmit a signal for requesting the positioning assistance data to the location server.

The location server may then transmit the positioning assistance data to the reference small cell base station, and the reference small cell base station may transmit the positioning assistance data to the UE (in a data format). A subsequent positioning measurement signaling flow is well-known for those skilled in the art, which is not described repeatedly here.

In addition, the location server may also determine to disable transmission of a PRS based on a value of the counter. When the transmitting for turning off the PRS is determined, the location server may transmit signaling for turning off the PRS to the macro cell base station.

The macro cell base station may then provide configuration information of a DRS in which no PRS is inserted to the off small cell base station.

The off small cell base station may transmit a DRS based on the configuration.

A wireless communication method in a wireless communication system according to an embodiment of the present disclosure is described next.

The wireless communication method in the wireless communication system according to the embodiment of the present disclosure may include: acquiring an on/off state of a small cell base station within a predetermined geographical region; and generating reconfiguration information of a positioning reference signal PRS for the small cell base station within the predetermined geographical region based on the acquired on/off state of the small cell base station, to position a user equipment within the predetermined geographical region.

Preferably, the reconfiguration information of the PRS may include a PRS transmission period of an on small cell base station. Furthermore, the wireless communication method may further include: adjusting the PRS transmission period of the on small cell base station based on a ratio of the number of off small cell base stations within the predetermined geographical region to the number of small cell base stations within the predetermined geographical region.

Preferably, the PRS transmission period of the on small cell base station may be reduced in a case that the ratio described above is greater than a first threshold, and the PRS transmission period of the on small cell base station may be increased in a case that the ratio described above is less than a second threshold.

Preferably, the reconfiguration information of the PRS may include PRS configuration assistance information of the off small cell base station within the predetermined geographical region. Furthermore, the wireless communication method may further include allocating a time frequency resource of the off small cell base station for transmitting the PRS as an idle resource to an on small cell base station.

Preferably, the idle resource may be allocated to the on small cell base station based on a priority level of the on small cell base station.

Preferably, the priority level is determined by: determining an on small cell base station for positioning respective user equipments based on a rough geographical location of the respective user equipments; counting the number of occurrence of the on small cell base station for positioning the respective user equipments within a predetermined time period; and determining the priority level based on a result of the counting.

Preferably, the reconfiguration information of the PRS may include blending information indicating that the PRS is configured in a discovery reference signal DRS. Furthermore, the wireless communication method may further include: generating the blending information based on the number of occurrence of an off small cell base station for positioning the respective user equipments within a predetermined time period.

Preferably, the blending information may include location information indicating a configuration position of the PRS in the DRS. Furthermore, the wireless communication method may further include generating the location information based on configuration information of the DRS.

In another aspect, a wireless communication method for a wireless communication system according to another embodiment of the present disclosure may include: determining reconfiguration information of a positioning reference signal PRS from a control device, where the reconfiguration information of the PRS includes blending information indicating that the PRS is configured in a discovery reference signal DRS; and reconfiguring the DRS based on the blending information, to position a user equipment.

Preferably, the blending information may include location information indicating a configuration location of the PRS in the DRS. Furthermore, the wireless communication method may further include reconfiguring the DRS based on the location information.

Preferably, the PRS may be configured to occupy 1, 2, or 4 subframes in the DRS.

Preferably, a period of the PRS may be configured to be n times of a period of the DRS, where n is a natural number.

In another aspect, a wireless communication method for a wireless communication system according to another embodiment of the present disclosure may include: determining reconfiguration information of a positioning reference signal PRS from a control device, where the reconfiguration information of the PRS includes PRS configuration assistance information of an off small cell base station; and reconfiguring the PRS based on the PRS configuration assistance information, to position a user equipment using a time frequency resource of the off small cell base station for transmitting a PRS as an idle resource.

Preferably, the PRS configuration assistance information may be specific location information on a resource element of the off small cell base station for transmitting the PRS.

Preferably, the PRS configuration assistance information may be PRS configuration information of the off small cell base station.

Preferably, the wireless communication method may further include: determining resource release information from the control device, where the resource release information indicates that the off small cell base station has been turned on; and reconfiguring the PRS based on the resource release information, to release the time frequency resource of the off small cell base station for transmitting the PRS.

In another aspect, a wireless communication method for a wireless communication system according to another embodiment of the present disclosure may include: determining positioning measurement assistance data for a user equipment, where the positioning measurement assistance data includes reconfiguration information of a positioning reference signal PRS of a small cell base station; performing positioning measurement on a PRS transmitted by the small cell base station based on the positioning measurement assistance data; and generating positioning information based on a result of the performing positioning measurement on the PRS transmitted by the small cell base station, to position the user equipment.

Preferably, the reconfiguration information of the PRS may include a PRS transmission period of an on-state small cell base station.

Preferably, the reconfiguration information of the PRS may include blending information indicating that the PRS is configured in a discovery reference signal DRS transmitted by an off small cell base station.

Preferably, the wireless communication method may further include: detecting the DRS of the off small cell base station, to extract the PRS for performing the positioning measurement.

Various implementations of steps above in the wireless communication methods for the wireless communication system according to the embodiments of the present disclosure are described in detail, which are not repeated here anymore.

The technology in the present disclosure can be applied into various products. For example, the location server in the present disclosure may be implemented as any type of servers, such as a tower server, a rack mounted server and a blade server. The location server may be a control module (such as an integrated circuit module including a single wafer, and a card or blade (blade) inserted into a slot of the blade server) mounted on a server.

For example, a base station (including the macro base station and the small base station described above) in the present disclosure can be implemented as any type of evolved node B (eNB), such as a macro eNB and a small eNB. The small eNB such as a pico eNB, micro eNB and a home (femto-cell) eNB may have a smaller coverage range than a macro cell. Alternatively, the base station may also be implemented as any other type of base stations, such as a NodeB and a base transceiver station (BTS). The base station may include a body (also referred to as a base station device) configured to control wireless communication; and one or more remote radio heads (RRHs) arranged in a different position from the body. In addition, various types of terminals described below may operate as a base station by temporarily or semi-persistently executing the function of the base station.

For example, the UE in the present disclosure can be implemented as a mobile terminal (such as a smart phone, a panel personnel computer (PC), a notebook PC, a portable game terminal, a portable/dongle mobile router and a digital camera) or an on-vehicle terminal (such as an automobile navigation device). The UE may also be implemented as a terminal (which is also referred as a machine-type communication (MTC) terminal) performing machine-to-machine (M2M) communication. In addition, the user equipment may be a wireless communication module (such as an integrated circuit module including a single wafer) mounted on each of the terminals described above.

Figure 9:
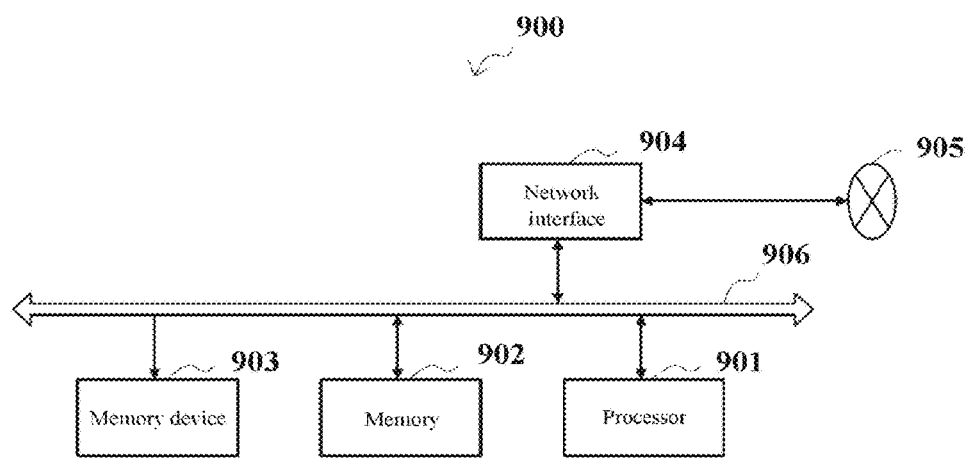
FIG. 9 is a block diagram showing a schematic configuration example of a server applicable to the present disclosure.

FIG. 9 is a block diagram showing a schematic configuration example of a server 900 in which the technology according to the present disclosure can be applied. The server 900 includes a processor 901, a memory 902, a memory device 903, a network interface 904 and a bus 906.

The processor 901 may be for example a central processing unit (CPU) or a digital signal processor (DSP), and controls a function of the server 900. The memory 902 includes a random access memory (RAM) and a read-only memory (ROM), and stores data and programs executed by the processor 901. The memory device 903 may include a memory medium, such as a semiconductor memory and a hard disc.

The network interface 904 is a wired communication interface for connecting the server 900 to a wired communication network 705. The wired communication network 705 may be for example a core network such as an evolved packet core (EPC) or a packet data network (PDN) such as Internet.

The bus 906 connects the processor 901, the memory 902, the memory device 903 and the network interface 904 together. The bus 906 may include two or more buses (for example a high-speed bus and a low-speed bus) having different speeds.

In the server 900 shown in FIG. 9, the processing circuit 110 and the acquisition unit 111 and the generation unit 112 shown in FIG. 1 may be implemented by the processor 901, and the communication unit 120 described in FIG. 1 may be implemented by the network interface 904. For example, the processor 901 may execute a function of acquiring an on/off state of a small cell base station and a function of generating reconfiguration information of a PRS by executing instruction stored in the memory 902 or the memory device 903.

Figure 10:
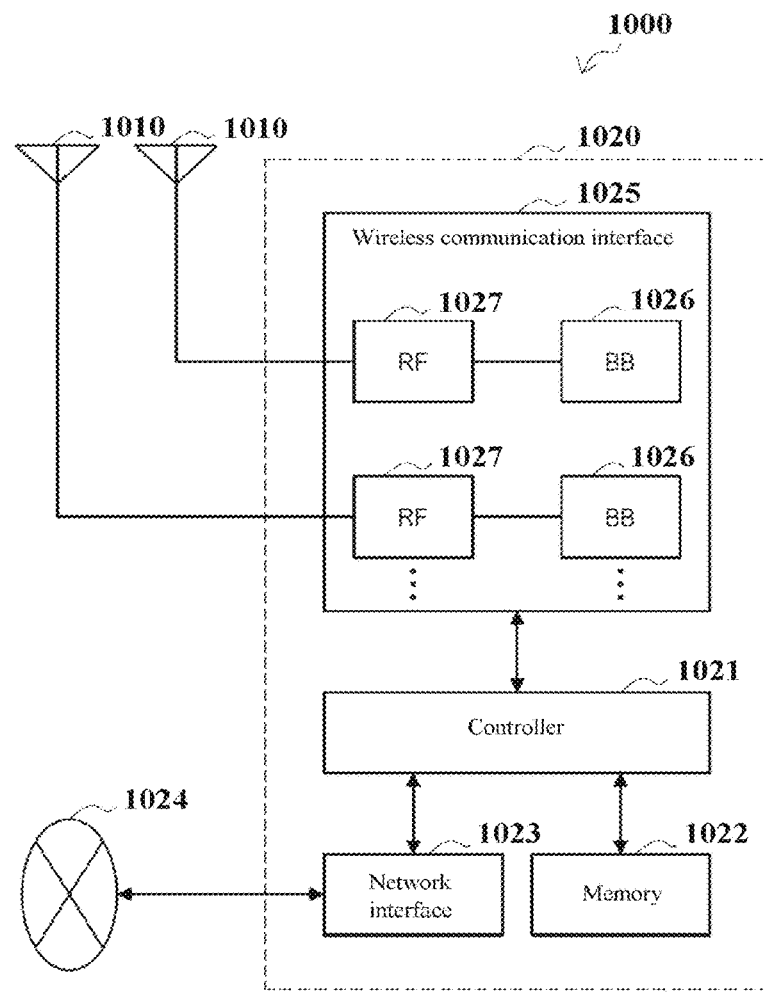
FIG. 10 is a block diagram showing a first schematic configuration example of an evolution node base station (eNB) applicable to the present disclosure.

FIG. 10 is a block diagram showing a schematic configuration example of an eNB in which the technology according to the present disclosure may be applied. An eNB 1000 includes one or more antennas 1010 and a base station device 1020. The base station device 1020 and each antenna 1010 may be connected with each other via an RF cable.

Each of the antennas 1010 includes one or more antenna elements (such as multiple antenna elements included in a multiple-input multiple-output (MIMO) antenna), and are used for transmitting and receiving a wireless signal by the base station device 1020. As show in FIG. 10, the eNB 1000 may include multiple antennas 1010. For example, the multiple antennas 1010 may be compatible with multiple frequency bands used by the eNB 1000. The eNB 1000 may also include a single antenna 1010 although FIG. 10 shows the example of the eNB 1000 including multiple antennas 1010.

The base station device 1020 includes a controller 1021, a memory 1022, a network interface 1023 and a wireless communication interface 1025.

For example, the controller 1021 may be a CPU or DSP, and performs various functions of higher layers of the base station device 1020. For example, the controller 1021 generates a data packet based on data in a signal processed by the wireless communication interface 1025, and transfers the generated packet via the network interface 1023. The controller 1021 may bundle data from multiple baseband processors to generate a bundled packet, and transfers the generated bundled packet. The controller 1021 may have a logical function performing a control such as radio resource control, radio bearer control, mobility management, admission control and scheduling. The control may be performed in conjunction with a neighboring eNB or a core network node. The memory 1022 includes a RAM and a ROM, and stores programs to be performed by the controller 1021 and various types of control data (such as a terminal list, transmission power data and scheduling data).

The network interface 1023 is a communication interface for connecting the base station device 1020 to the core network 1024. The controller 1021 may communicate with a core network node or another eNB via the network interface 1023. In this case, the eNB 1000 and the core network node or another eNB may be connected with each other via a logic interface (such as interface S1 and interface X2). The network interface 1023 may also be a wired communication interface or a wireless communication interface for wireless backhaul routing. If the network interface 1023 is a wireless communication interface, the network interface 1023 may perform wireless communication with a frequency band higher than a frequency band used by the wireless communication interface 1025.

The wireless communication interface 1025 supports any cellular communication scheme (such as the long term evolution (LTE) and the LTE-Advanced), and provides a wireless connection to a terminal located in the cell of the eNB 1000 via the antenna 1010. The wireless communication interface 1025 may generally include for example a baseband (BB) processor 1026 and an RF circuit 1027. The BB processor 1026 may perform for example coding/decoding, modulation/demodulation and multiplexing/de-multiplexing, and performs various types of signal processing of the layer (for example L1, media access control (MAC), radio link control (RLC) and packet data convergence protocol (PDCP)). Instead of the controller 1021, the BB processor 1026 may have some or all of the above logical functions. The BB processor 1026 may be a memory storing communication control programs, or a module including a processor and modules of a related circuit configured to perform the programs. An updating program may change the function of the BB processor 1026. The module may be a card or a blade inserted into the slot of the base station device 1020. Alternatively, the module may be a chip mounted on the card or the blade. The RF circuit 1027 may include for example a frequency mixer, a filter and an amplifier, and transmit and receive a wireless signal via the antenna 1010.

As shown in FIG. 10, the wireless communication interface 1025 may include multiple BB processors 1026. For example, the multiple BB processors 1026 may be compatible with the multiple frequency bands used by the eNB 1000. As shown in FIG. 10, the wireless communication interface 1025 may include multiple RF circuits 1027. For example, the multiple RF circuits 1027 may be compatible with multiple antenna elements. Although an example in which the wireless communication interface 1025 includes multiple BB processors 1026 and multiple RF circuits 1027 is shown in FIG. 10, the wireless communication interface 1025 may include a single BB processor 1026 or a single RF circuit 1027.

Figure 11:
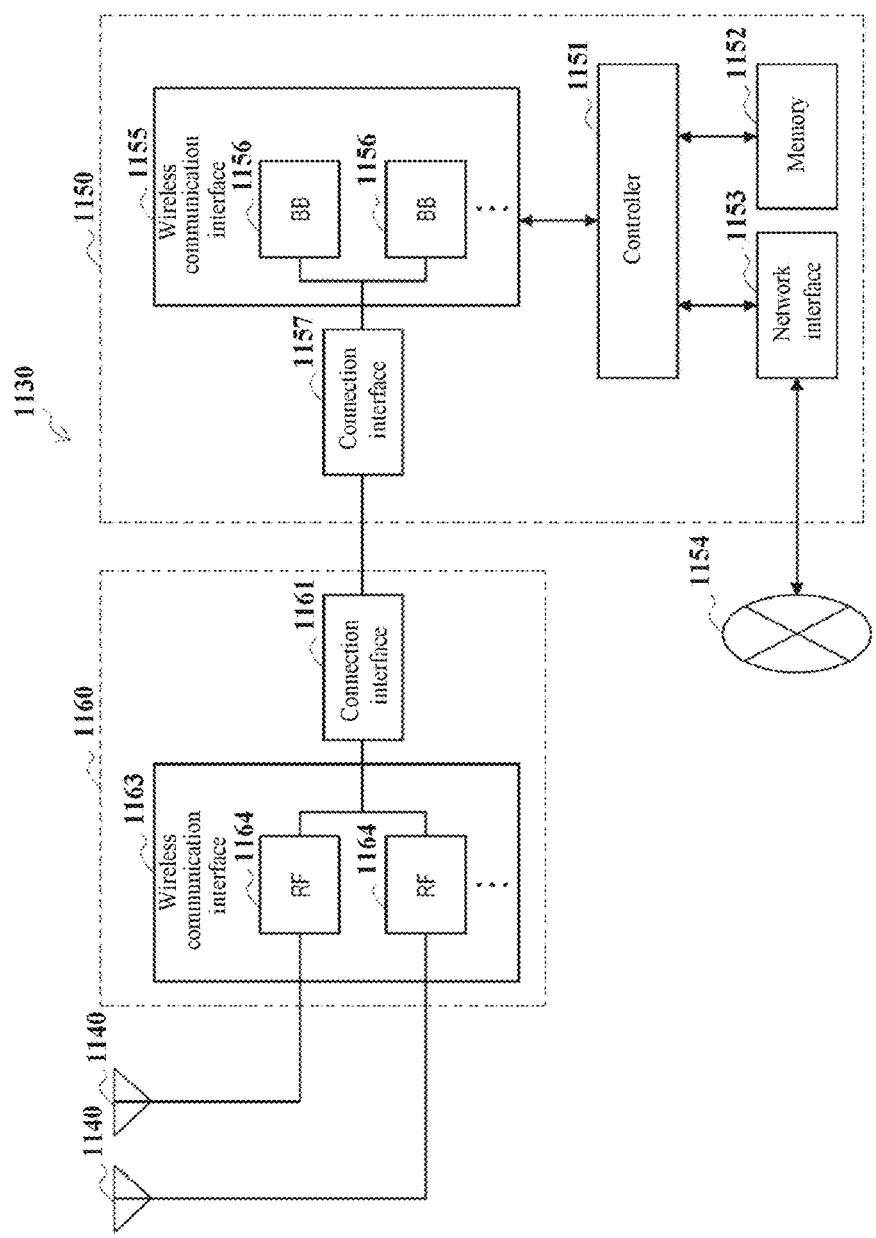
FIG. 11 is a block diagram showing a second schematic configuration example of an eNB applicable to the present disclosure.

FIG. 11 is a block diagram showing a second schematic configuration example of an eNB to which the technology according to the present disclosure is applied. An eNB 1100 includes one or more antennas 1140, a base station device 1150 and an RRH 1160. The RRH 1160 may be connected to each of the antennas 1140 via an RF cable. The base station device 1150 and the RRH 1160 may be connected to each other via a high-speed line such as an optical fiber cable.

Each of the antennas 1140 includes one or more antenna elements (such as the multiple antenna elements included in the MIMO antenna), and is used for the RRH 1160 to transmit and receive the wireless signal. As show in FIG. 11, the eNB 1130 may include multiple antennas 1140. For example, the multiple antennas 1140 may be compatible with the multiple frequency bands used by the eNB 1130. The eNB 1130 may also include a single antenna 1140 although FIG. 11 shows an example in which the eNB 1130 includes multiple antennas 1140.

The base station device 1150 includes a controller 1151, a memory 1152, a network interface 1153, a wireless communication interface 1155 and a connection interface 1157. The controller 1151, the memory 1152 and the network interface 1153 are the same as the controller 1021, the memory 1022 and the network interface 1023 described by referring to FIG. 10.

The wireless communication interface 1155 supports any cellular communication scheme (such as LTE and the LTE-Advanced), and provides a wireless communication to a terminal located in a sector corresponding to the RRH 1160 via the RRH 1160 and the antenna 1140. The wireless communication interface 1155 may typically include, for example, a BB processor 1156. The BB processor 1156 is the same as the BB processor 1026 described by referring to FIG. 10, except that the BB processor 1156 is connected to an RF circuit 1164 of the RRH 1160 via the connection interface 1157. As show in in FIG. 11, the wireless communication interface 1155 may include multiple BB processors 1156. For example, the multiple BB processors 1156 may be compatible with multiple frequency bands used by the eNB 1130. Although FIG. 11 shows an example that the wireless communication interface 1155 includes multiple BB processors 1156, the wireless communication interface 1155 may also include a single BB processor 1156.

The connection interface 1157 is an interface for connecting the base station device 1150 (the wireless communication interface 1155) to the RRH 1160. Alternatively, the connection interface 1157 may be a communication module for communication in the above-described high-speed line that connects the base station device 1150 (the wireless communication interface 1155) to the RRH 1160.

The RRH 1160 includes a connection interface 1161 and a wireless communication interface 1163.

The connection interface 1161 is an interface for connecting the RRH 1160 (the wireless communication interface 1163) to the base station device 1150. The connection interface 1161 may also be a communication module for the communication in the above high-speed line.

The wireless communication interface 1163 transmits and receives radio signals via the antenna 1140. The wireless communication interface 1163 may typically include, for example, an RF circuit 1164. The RF circuit 1164 may include, for example, a mixer, a filter and an amplifier, and transmits and receives radio signals via the antenna 1140. As shown in FIG. 11, the wireless communication interface 1163 may include multiple RF circuits 1164. For example, multiple RF circuits 1164 may support multiple antenna elements. Although FIG. 12 shows an example in which the wireless communication interface 1163 includes multiple RF circuits 1164, the wireless communication interface 1163 may include a single RF circuit 1164.

In the eNB 1000 and eNB 1130 shown in FIG. 10 and FIG. 11, the processing circuit 210 and the determination unit 211 and the reconfiguration unit 212 shown in FIG. 2 and the processing circuit 211 and the determination unit 311 and the PRS reconfiguration unit 312 shown in FIG. 3 may be implemented by the controller 1021 and/or the controller 1151, and the communication unit 221 shown in FIG. 2 and the communication unit 320 shown in FIG. 3 may be implemented by the wireless communication interface 1025 and the wireless communication interface 1155 and/or the wireless communication interface 1163. For example, the controller 1021 and/or the controller 1151 may execute a function of determining reconfiguration information of a PRS and a function of reconfiguring a DRS/PRS by executing instructions stored in the memory.

Figure 12:
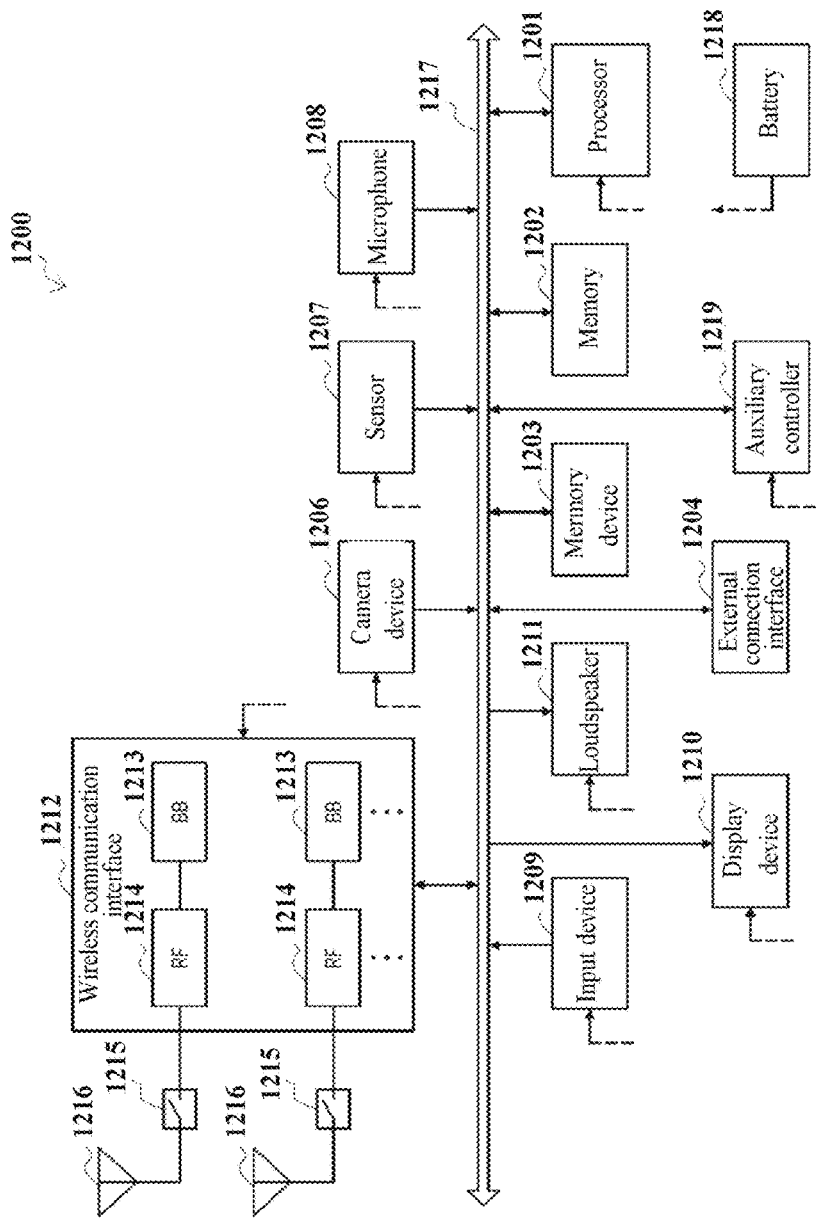
FIG. 12 is a block diagram showing a schematic configuration example of a smart phone applicable to the present disclosure.

FIG. 12 is a block diagram showing a schematic configuration example of a smart phone 1200 in which the technology according to the present disclosure may be applied. The smart phone 1200 includes a processor 1201, a memory 1202, a memory device 1203, an external connection interface 1204, a camera device 1206, a sensor 1207, a microphone 1208, an input device 1209, a display device 1210, a loudspeaker 1211, a wireless communication interface 1212, one or more antenna switches 1215, one or more antennas 1216, a bus 1217, a battery 1218 and an auxiliary controller 1219.

The processor 1201 may be for example a CPU or a system on chip (SoC), and controls functions of an application layer and an additional layer of the smart phone 1200. The memory 1202 includes a RAM and a ROM, and stores programs executed by the processor 1201 and data. The memory device 1203 may include a memory medium such as a semiconductor memory and a hard disk. The external connection interface 1204 is an interface connecting the external device (such as a memory card and a universal serial bus (USB) device) to the smart phone 1200.

The camera device 1206 includes an image sensor (such as a charge-coupled device (CCD) and a complementary metal oxide semiconductor (CMOS)), and generates a captured image. The sensor 1207 may include a group of sensors such as a measurement sensor, a gyroscope sensor, a geomagnetic sensor and an acceleration sensor. The microphone 1208 converts voice inputted to the smart phone 1200 into an audio signal. The input device 1209 includes a touch sensor configured to detect touch on a screen of the display device 1210, a keypad, a keyboard, a button or a switch and receives an operation and information inputted from the user. The display device 1210 includes a screen (such as a liquid crystal display (LCD) and an organic light-emitting diode (OLED) display), and displays an output image of the smart phone 1200. The loudspeaker 1211 converts the audio signal outputted from the smart phone 1200 into voice.

The wireless communication interface 1212 supports any cellular communication scheme (such as LTE and LTE-advanced), and performs a wireless communication. The wireless communication interface 1212 may include for example a BB processor 1213 and an RF circuit 1214. The BB processor 1213 may execute for example coding/decoding, modulation/demodulation and multiplexing/demultiplexing, and execute various types of signal processing for wireless communication. Meanwhile, the RF circuit 1214 may include for example a frequency mixer, a filter or an amplifier, and transmit and receive a radio signal via the antenna 1216. The wireless communication interface 1212 may be a chip module on which the BB processor 1213 and the RF circuit 1214 are integrated. Although the wireless communication interface 1212 shown in FIG. 12 includes multiple BB processors 1213 and multiple RF circuits 1214, the wireless communication interface 1212 may include a single BB processor 1213 or a single RF circuit 1214.

In addition to the cellular communication scheme, the wireless communication interface 1212 may support another type of wireless communication scheme, such as a short-distance wireless communication scheme, a near field communication scheme and a wireless local area network (LAN) scheme. In this case, the wireless communication interface 1212 may include a BB processor 1213 and an RF circuit 1214 for each of the wireless communication schemes.

Each of the antenna switches 1215 switches a connection destination of the antenna 1216 between multiple circuits (for example, circuits for different wireless communication schemes) included in the wireless communication interface 1212.

Each of the antennas 1216 includes one or more antenna elements (for example, multiple antenna elements included in the MIMO antenna), and is used for transmitting and receiving a radio signal via the wireless communication interface 1212. As shown in FIG. 12, the smart phone 1200 may include multiple antennas 1216. Although the smart phone 1200 shown in FIG. 12 includes multiple antennas 1216, the smart phone 1200 may include a single antenna 1216.

In addition, the smart phone 1200 may include an antenna 1216 for each of the wireless communication schemes. In this case, the antenna switch 1215 may be omitted in the configuration of the smart phone 1200.

The processor 1201, the memory 1202, the memory device 1203, the external connection interface 1204, the camera device 1206, the sensor 1207, the microphone 1208, the input device 1209, the display device 1210, the loudspeaker 1211, the wireless communication interface 1212 and the auxiliary controller 1219 are connected with one another via the bus 1217. The battery 1218 supplies power to blocks of the smart phone 1200 shown in FIG. 12 via a feed line. The feed line is partially shown with a dash line in FIG. 12. The auxiliary controller 1219 operates a minimum necessary function of the smart phone 1200 in a sleep mode.

In the smart phone 1200 shown in FIG. 12, the processing circuit 410 and the determination unit 411, the measurement unit 412 and the generation unit 412 therein may be implemented by the processor 1201 or the auxiliary controller 1219, and the communication unit 420 described in FIG. 4 may be implemented by the wireless communication interface 1212. At least part of the functions may also be implemented by the processor 1201 or the auxiliary controller 1219. For example, the processor 1201 or the auxiliary controller 1219 may execute a function of determining positioning measurement assistance data, a function of performing positioning measurement and a function of generating positioning information by executing instructions stored in the memory 1201 or the memory device 1203.

Figure 13:
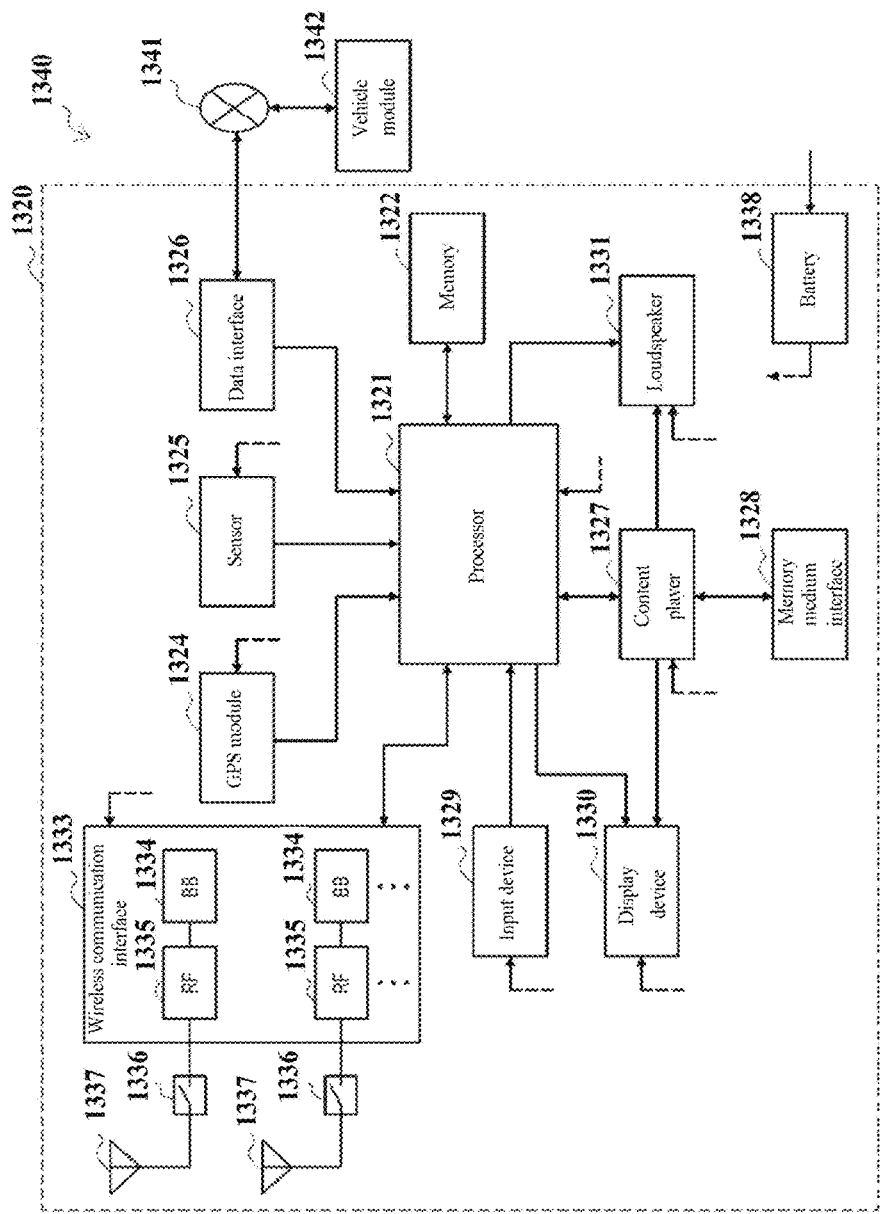
FIG. 13 is a block diagram showing a schematic configuration example of an automobile navigation device applicable to the present disclosure.

FIG. 13 is a block diagram showing a schematic configuration example of an automobile navigation device to which the technology according to the present disclosure may be applied. The automobile navigation device 1320 includes a processor 1321, a memory 1322, a global positioning system (GPS) module 1324, a sensor 1325, a data interface 1326, a content player 1327, a memory medium interface 1328, an input device 1329, a display device 1330, a loudspeaker 1331, a wireless communication interface 1333, one or more antenna switches 1336, one or more antennas 1337 and a battery 1338.

The processor 1321 may be for example a CPU or an SoC, and controls a navigation function and other functions of the automobile navigation device 1320. The memory 1322 includes a RAM and a ROM, and stores programs executed by the processor 1321 and data.

The GPS module 1324 measures a location (such as latitude, longitude and altitude) of the automobile navigation device 1320 using a GPS signal received from the GPS satellite. The sensor 1325 may include a set of sensors such as a gyroscope sensor, a geomagnetic sensor and an air pressure sensor. The data interface 1326 is connected to for example an in-vehicle network 1341 via a terminal not shown, and acquires data (for example data on a vehicle speed) generated by the vehicle.

The content player 1327 reproduces content stored in the memory medium (such as a CD or a DVD), and the memory medium is inserted into the memory medium interface 1328. The input device 1329 includes for example a touch sensor, a button or a switch configured to detect touch on a screen of the display device 1330, and receives an operation and information inputted from the user. The display device 1330 includes for example a screen of an LCD or an OLED display, and displays an image of a navigation function and reproduced content. The loudspeaker 1331 inputs voice of the navigation function and the reproduced content.

The wireless communication interface 1333 supports any cellular communication scheme (such as the LTE and the LTE-Advanced), and executes wireless communication. The wireless communication interface 1333 may generally include for example a baseband (BB) processor 1334 and an RF circuit 1335. The BB processor 1334 may perform for example coding/decoding, modulation/demodulation and multiplexing/de-multiplexing, and performs various types of signal processing for wireless communication. The RF circuit 1335 may include for example a frequency mixer, a filter and an amplifier, and transmit and receive a wireless signal via the antenna 1337. The wireless communication interface 1333 may be a chip module on which the BB processor 1334 and the RF circuit 1335 are integrated. As shown in FIG. 13, the wireless communication interface 1333 may include multiple BB processors 1334 and multiple RF circuits 1335. Although the wireless communication interface 1333 shown in FIG. 13 includes multiple BB processors 1334 and multiple RF circuits 1335, the wireless communication interface 1333 may include a single BB processor 1334 or a single RF circuit 1335.

In addition to the cellular communication scheme, the wireless communication interface 1333 may support another type of wireless communication scheme, such as a short-distance wireless communication scheme, a near field communication scheme and a wireless LAN scheme. In this case, the wireless communication interface 1333 may include a BB processor 1334 and an RF circuit 1335 for each of the wireless communication schemes.

Each of the antenna switches 1336 switches a connection destination of the antenna 1337 between multiple circuits (for example, circuits for different wireless communication schemes) included in the wireless communication interface 1333.

Each of the antennas 1337 includes one or more antenna elements (for example, multiple antenna elements included in the MIMO antenna), and is used for transmitting and receiving a radio signal via the wireless communication interface 1333. As shown in FIG. 13, the automobile navigation device 1320 may include multiple antennas 1337. Although the automobile navigation device 1320 shown in FIG. 13 includes multiple antennas 1337, the automobile navigation device 1320 may include a single antenna 1337.

In addition, the automobile navigation device 1320 may include an antenna 1337 for each of the wireless communication schemes. In this case, the antenna switch 1336 may be omitted in the configuration of the automobile navigation device 1320.

The battery 1338 supplies power to blocks of the automobile navigation device 1320 shown in FIG. 13 via a feed line. The feed line is partially shown with a dash line in FIG. 13. The battery 1338 accumulates electric power supplied by the vehicle.

In the automobile navigation device 1320 shown in FIG. 13, the processing circuit 410 and the determination unit 411, the measurement unit 412 and the generation unit 413 in the processing circuit 410 shown in FIG. 4 may be implemented by the processor 1321, and the communication unit 420 shown in FIG. 4 may be implemented by the wireless communication interface 1333. At least part of the functions may be implemented by the processor 1321. For example, the processor 1321 may execute a function of determining positioning measurement assistance data, a function of performing positioning measurement and a function of generating positioning information by executing instructions stored in the memory 1322.

The technology according to the present disclosure may be implemented as an in-vehicle system (or a vehicle) 1340 including one or more of the automobile navigation device 1320, the in-vehicle network 1341 and the vehicle module 1342. The vehicle module 1342 generates vehicle data (such as a vehicle speed, an engine speed and fault information), and transmits the generated data to the in-vehicle network 1341.

In the system and the method according to the present disclosure, it is apparent that the respective components or steps can be decomposed and/or recombined. These decompositions and/or recombinations shall be regarded as equivalent schemes of the present disclosure. Moreover, the steps for executing the above series of processing can naturally be performed in the sequence as described above but will not be limited thereto, and some of the steps can be performed in parallel or independently from each other.

Although the embodiments of the present disclosure have been described above in detail in connection with the drawings, it should be appreciated that the embodiments as described above are only intended to illustrate the present disclosure but not to limit the present disclosure. Those skilled in the art can make various modifications and variations onto the above embodiments without departing from the spirit and scope of the present disclosure. Therefore, the scope of the present disclosure is defined merely by the appended claims and their equivalents.

The invention claimed is:

1. An electronic device in a wireless communication system, comprising one or more processing circuits configured to:
   acquire an on/off state of a small cell base station within a predetermined geographical region; and
   generate, based on the acquired on/off state of the small cell base station, reconfiguration information of a positioning reference signal PRS for the small cell base station within the predetermined geographical region, to position a user equipment within the predetermined geographical region, wherein
   the reconfiguration information of the PRS comprises a PRS transmission period of an on small cell base station, and the processing circuits are further configured to adjust the PRS transmission period of the on small cell base station based on a ratio of the number of off small cell base stations within the predetermined geographical region to the number of small cell base stations within the predetermined geographical region.

2. The electronic device according to claim 1, wherein the processing circuits are configured to reduce the PRS transmission period of the on small cell base station in a case that the ratio is greater than a first threshold, and increase the PRS transmission period of the on small cell base station in a case that the ratio is less than a second threshold.

3. The electronic device according to claim 1, wherein the reconfiguration information of the PRS comprises PRS configuration assistance information of an off small cell base station within the predetermined geographical region, and the processing circuits are further configured to allocate a time frequency resource of the off small cell base station for transmitting a PRS as an idle resource to an on small cell base station.

4. The electronic device according to claim 3, wherein the processing circuits are configured to allocate the idle resource to the on small cell base station based on a priority level of the on small cell base station.

5. The electronic device according to claim 4, wherein the processing circuits are configured to determine the priority level by:
   determining an on small cell base station for positioning respective user equipment based on a rough geographical location of the respective user equipment;
   counting the number of occurrence of the on small cell base station for positioning the respective user equipment within a predetermined time period; and
   determining the priority level based on a result of the counting.

6. The electronic device according to claim 1, wherein the reconfiguration information of the PRS comprises blending information indicating that the PRS is configured in a discovery reference signal DRS, and the processing circuits are further configured to generate the blending information based on the number of occurrence of an off small cell base station for positioning the respective user equipment within a predetermined time period.

7. The electronic device according to claim 6, wherein the blending information comprises location information indicating a configuration position of the PRS in the DRS, and the processing circuits are further configured to generate the location information based on configuration information of the DRS.

8. The electronic device according to claim 1, wherein the electronic device is a location server in a core network.

9. An electronic device in a wireless communication system, comprising one or more processing circuits configured to:
  determine reconfiguration information of a positioning reference signal PRS from a control device, wherein the reconfiguration information of the PRS comprises blending information indicating that the PRS is configured in a discovery reference signal DRS; and
  reconfigure the DRS based on the blending information, to position a user equipment, wherein the one or more processing circuits are further configured to generate the blending information based on a number of occurrence of an off small cell base station for positioning the user equipment within a predetermined time period, and the blending information comprises location information indicating a configuration location of the PRS in the DRS, and the one or more processing circuits are configured to reconfigure the DRS based on the location information.

10. The electronic device according to claim 9, wherein the processing circuits are configured to configure the PRS to occupy 1, 2, or 4 subframes in the DRS.

11. The electronic device according to claim 9, wherein the processing circuits are configured to configure a period of the PRS to be n times of a period of the DRS, wherein n is a natural number.

12. The electronic device according to claims 9, wherein the electronic device is a small cell base station in an off state, and further comprises a transceiver configured to transmit the DRS via an air interface.

13. An electronic device in a wireless communication system, comprising one or more processing circuits configured to:
  determine reconfiguration information of a positioning reference signal PRS from a control device, wherein the reconfiguration information of the PRS comprises PRS configuration assistance information of an off small cell base station;
  reconfigure the PRS based on the PRS configuration assistance information, to position a user equipment using a time frequency resource of the off small cell base station for transmitting a PRS as an idle resource;
  determine resource release information from the control device, wherein the resource release information indicates that the off small cell base station has been turned on; and
  reconfigure the PRS based on the resource release information, to release the time frequency resource of the off small cell base station for transmitting the PRS.

14. The electronic device according to claim 13, wherein the PRS configuration assistance information is specific location information on a resource element of the off small cell base station for transmitting the PRS.

15. The electronic device according to claim 13, wherein the PRS configuration assistance information is PRS configuration information of the off small cell base station.

16. The electronic device according to claim 13, wherein the electronic device is a small cell base station in an on-state, and further comprises a transceiver configured to transmit the PRS via an air interface.

* * * * *